US012775715B1

(12) United States Patent
Bazhaniuk et al.

(10) Patent No.: US 12,775,715 B1
(45) Date of Patent: Oct. 27, 2026

(54) INFRASTRUCTURE BINARY VULNERABILITY, MALWARE AND BACKDOOR DETECTION USING MULTIPLE ANALYSIS TECHNIQUES

(71) Applicant: Eclypsium, Inc., Portland, OR (US)

(72) Inventors: Oleksandr Bazhaniuk, Portland, OR (US); Daniel Gutson, Buenos Aires (AR)

(73) Assignee: Eclypsium, Inc., Portland, OR (US)

( * ) Notice: Subject to any disclaimer, the term of this patent is extended or adjusted under 35 U.S.C. 154(b) by 0 days.

(21) Appl. No.: 19/574,373

(22) Filed: Mar. 22, 2026

(51) Int. Cl.
*G06F 21/57* (2013.01)
*G06F 18/20* (2023.01)
*G06F 21/54* (2013.01)

(52) U.S. Cl.
CPC .......... *G06F 21/577* (2013.01); *G06F 18/295* (2023.01); *G06F 21/54* (2013.01)

(58) Field of Classification Search
CPC ....... G06F 21/577; G06F 18/295; G06F 21/54
See application file for complete search history.

(56) References Cited

U.S. PATENT DOCUMENTS 10,846,401 B2 11/2020 Ferrara et al.
11,108,809 B2 8/2021 Johns et al.
11,580,218 B2 2/2023 Salem et al.
11,637,859 B1 4/2023 Johns et al.
(Continued)

FOREIGN PATENT DOCUMENTS

WO 2019083737 A1 5/2019
WO 2025075780 A1 4/2025

OTHER PUBLICATIONS

Qingyang W, Quanrui H, Yuqiao N, Chenya B, Zhen G, Shiwen S. A Survey of Binary Code Security Analysis. In2023 6th International Conference on Data Science and Information Technology (DSIT) Jul. 28, 2023 (pp. 42-49). IEEE. (Year: 2023).*
(Continued)

*Primary Examiner* — James R Turchen
(74) *Attorney, Agent, or Firm* — CipherLaw

(57) ABSTRACT

A computer-implemented method for detecting vulnerabilities, malware and implants within infrastructure binaries includes receiving an infrastructure binary associated with infrastructure components, extracting the binary using binary analysis tools to decompose and retrieve individual executable components, and applying multiple analysis techniques. The techniques include decompiling the extracted binary using a rule-based decompiler that utilizes interprocedural analysis, implements reverse engineering techniques including type recovery and discovery using convolutional neural networks trained on disassembled code patterns, constructs control flow graphs through parallel processing, and conducts whole-program analysis. The method includes emulating the extracted binary, performing symbolic execution, simultaneously executing multiple pattern matching and analysis processes including semantic pattern matching, functional similarity analysis, behavioral pattern matching, and random forest classifier for anomaly detection, integrating outputs into a unified model, conducting an examination to detect threats, generating a security report, and transmitting or displaying the report.

20 Claims, 10 Drawing Sheets

(56) References Cited

U.S. PATENT DOCUMENTS

| | | | | |
|---|---|---|---|---|
| 11,900,086 | B2 | 2/2024 | Haile et al. | |
| 12,169,556 | B2 | 12/2024 | Salem et al. | |
| 12,229,255 | B2 * | 2/2025 | Youngberg | G06F 21/105 |
| 12,481,764 | B2 | 11/2025 | Regev et al. | |
| 2006/0037080 | A1 | 2/2006 | Maloof | |
| 2017/0169229 | A1 * | 6/2017 | Brucker | G06F 21/566 |
| 2019/0132334 | A1 | 5/2019 | Johns et al. | |
| 2021/0256426 | A1 * | 8/2021 | Calvano | G06N 3/0499 |
| 2022/0019659 | A1 | 1/2022 | Salem et al. | |
| 2022/0067174 | A1 * | 3/2022 | Gupta | G06F 21/577 |
| 2022/0121429 | A1 | 4/2022 | Haile et al. | |
| 2022/0261480 | A1 * | 8/2022 | Youngberg | G06F 21/105 |
| 2022/0358214 | A1 | 11/2022 | Anderson et al. | |
| 2022/0391496 | A9 | 12/2022 | Salem et al. | |
| 2023/0021226 | A1 * | 1/2023 | Bobrov | G06F 21/577 |
| 2023/0222429 | A1 * | 7/2023 | Alsharif | G06Q 10/06398 705/7.41 |
| 2023/0336584 | A1 | 10/2023 | Johns et al. | |
| 2024/0184884 | A1 | 6/2024 | Salem et al. | |
| 2024/0320343 | A1 * | 9/2024 | Lang | G06F 21/577 |
| 2025/0013753 | A1 * | 1/2025 | Conway | G06F 21/577 |
| 2025/0021657 | A1 * | 1/2025 | Andriukhin | G06F 21/577 |
| 2025/0181709 | A1 | 6/2025 | Salem et al. | |
| 2025/0238508 | A1 | 7/2025 | David et al. | |
| 2025/0315524 | A1 * | 10/2025 | Larson | G06F 21/56 |

OTHER PUBLICATIONS

Shoshitaishvili Y, Wang R, Salls C, Stephens N, Polino M, Dutcher A, Grosen J, Feng S, Hauser C, Kruegel C, Vigna G. Sok:(state of) the art of war: Offensive techniques in binary analysis. In2016 IEEE symposium on security and privacy (SP) May 22, 2016 (pp. 138-157). IEEE. (Year: 2016).*

Ul Haq S, Singh Y, Sharma A, Gupta R, Gupta D. A survey on IoT & embedded device firmware security: architecture, extraction techniques, and vulnerability analysis frameworks. Discover Internet of Things. Oct. 31, 2023;3(1):17. (Year: 2023).*

* cited by examiner

INFRASTRUCTURE BINARY VULNERABILITY, MALWARE AND BACKDOOR DETECTION USING MULTIPLE ANALYSIS TECHNIQUES

FIELD OF INVENTION

The present disclosure relates to computer-implemented methods and systems for analyzing binaries, and more particularly to detecting vulnerabilities, malware and implants within infrastructure binaries using multiple analysis techniques.

BACKGROUND

The field of cybersecurity has become increasingly critical in recent years, particularly with regard to the protection of infrastructure binaries. These binaries, which include firmware, bootloaders, and drivers, form the foundational layer of modern computing systems and are integral to the proper functioning of hardware devices. As such, they present a unique set of challenges and vulnerabilities that demand specialized attention from security researchers and practitioners.

Infrastructure binaries operate at a low level within computing systems, often with privileged access to hardware resources. This privileged position makes them attractive targets for malicious actors seeking to establish persistent footholds or bypass higher-level security measures. The compromise of these binaries can have far-reaching consequences, affecting the integrity and security of entire systems or networks.

Historically, the security of infrastructure binaries has been somewhat overlooked, with greater emphasis placed on application-level security and network defenses. However, recent high-profile incidents have highlighted the potential for devastating attacks that exploit vulnerabilities in firmware, bootloaders, and drivers. These incidents have underscored the need for more robust security measures and analysis techniques specifically tailored to infrastructure binaries.

One of the primary challenges in securing infrastructure binaries lies in their diverse and often proprietary nature. Unlike standardized application code, infrastructure binaries can vary significantly across different hardware platforms and manufacturers. This diversity complicates the development of universal security solutions and necessitates specialized approaches for different types of binaries.

Furthermore, the analysis of infrastructure binaries presents unique technical challenges. These binaries are often highly optimized, lack debugging information, and may employ custom or obscure instruction sets. Traditional reverse engineering and vulnerability assessment tools, which are typically designed for application-level code, may be insufficient or ineffective when applied to infrastructure binaries.

The complexity of infrastructure binaries also introduces challenges in terms of scalability and performance. Given the critical nature of these binaries and their role in system startup and operation, security analysis techniques must be both thorough and efficient. Balancing the need for comprehensive analysis with the constraints of processing time and resource utilization remains an ongoing challenge in the field.

Another significant issue in the realm of infrastructure binary security is the difficulty of updating and patching vulnerable binaries. Unlike application software, which can often be easily updated through automated processes, infrastructure binaries may require specialized update procedures or even physical access to devices. This can lead to prolonged exposure to known vulnerabilities and increased risk of exploitation.

The rise of malware targeting infrastructure binaries has further complicated the security landscape. Advanced persistent threats (APTs) and nation-state actors have demonstrated the ability to develop targeted malware that can persist in firmware or bootloaders, evading detection by traditional security measures. These threats underscore the need for specialized detection and analysis capabilities specifically designed for infrastructure binaries.

The interconnected nature of modern computing environments also poses challenges for infrastructure binary security. As devices become increasingly networked and interdependent, vulnerabilities in one binary can impact entire ecosystems of connected devices. This interconnectedness amplifies the impact of security breaches and necessitates a holistic approach to security that considers the broader context in which infrastructure binaries operate.

Moreover, the rapid pace of technological advancement in areas such as Internet of Things (IoT) devices, edge computing, and embedded systems has led to a proliferation of new infrastructure binaries. Many of these binaries are developed with a focus on functionality and performance, often at the expense of security considerations. This trend has expanded the attack surface and introduced new vectors for exploitation.

The regulatory landscape surrounding infrastructure binary security is also evolving, with new standards and compliance requirements emerging in various industries. These regulatory changes place additional pressure on organizations to implement robust security measures for infrastructure binaries, further highlighting the need for advanced analysis and protection techniques.

In light of these challenges, there is a pressing need for improved methods to detect vulnerabilities, malware and implants within infrastructure binaries. Existing solutions often fall short in terms of their ability to analyze these binaries, detect threats, and scale to meet the demands of modern computing environments.

The security of infrastructure binaries represents a critical and evolving challenge in the field of cybersecurity. The unique characteristics of these binaries, combined with their fundamental role in system operation and the increasing sophistication of threats targeting them, necessitate the development of specialized security solutions. There is a clear need for scalable and efficient methods for analyzing infrastructure binaries and detecting vulnerabilities or threats. Addressing this need may improve the overall security posture of computing systems and protect against a wide range of emerging threats.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The present disclosure provides a computer-implemented method, system, and non-transitory computer-readable storage medium for detecting vulnerabilities, malware and implants within infrastructure binaries by receiving an infrastructure binary exhibiting predictable execution flows and component reuse patterns associated with infrastructure components, extracting the infrastructure binary using binary analysis tools to decompose and retrieve individual executable components, applying multiple analysis techniques including performing a decompilation process using a rule-based decompiler that utilizes interprocedural analysis to trace function calls, variable usage, and pointer references, implements reverse engineering techniques comprising type recovery and discovery using convolutional neural networks trained on disassembled code patterns, constructs control flow graphs through parallel processing mechanisms, and conducts whole-program analysis to detect cross-function behaviors indicative of threats, performing an emulation process within an emulation environment configured to simulate hardware interfaces, performing symbolic execution in parallel with the decompilation and emulation processes to generate symbolic inputs tailored to infrastructure components, explore multiple execution pathways to detect vulnerabilities, configure the symbolic execution process with bounded execution paths, parallel CFG generation, and state management techniques, and validate identified vulnerabilities to ascertain exploitability, simultaneously executing multiple pattern matching and analysis processes including semantic pattern matching, functional similarity analysis, behavioral pattern matching, and random forest classifier trained on labeled vulnerability datasets for anomaly detection, integrating outputs from the multiple analysis techniques into a unified model, conducting an examination of the integrated outputs to detect threats, generating a security report detailing detected issues, severity ratings, and contextual data, and electronically storing the security report locally or displaying the security report on a user interface of the computing device, wherein the security report includes information identifying which combination of the multiple analysis techniques contributed to each detection.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

A detailed description of systems, devices, and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

System Overview

Figure 1:
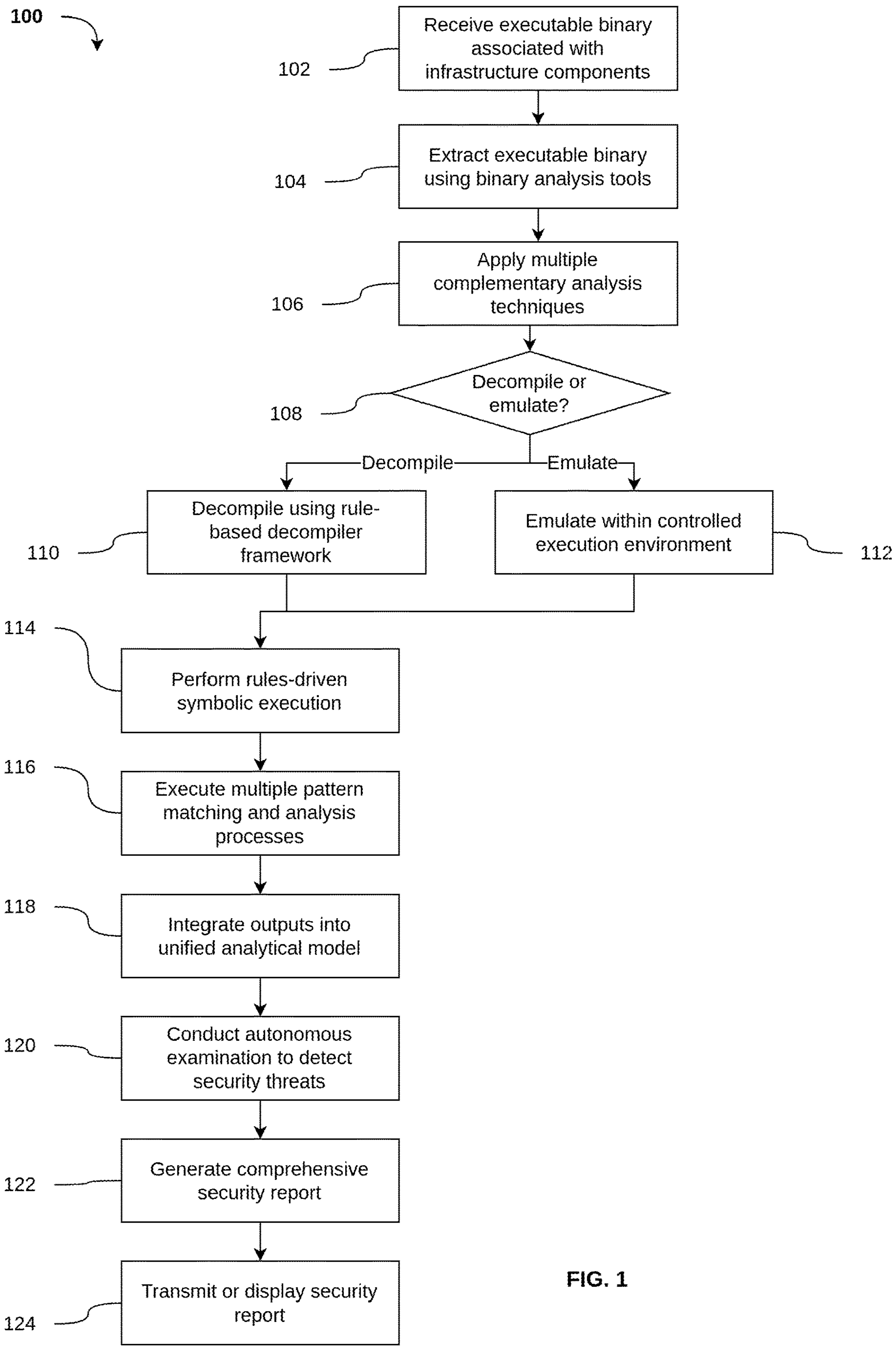
FIG. 1 illustrates a flowchart for detecting security vulnerabilities in binary files, according to aspects of the present disclosure.

FIG. 1 illustrates a flowchart for a method 100 of detecting security vulnerabilities in binary files associated with infrastructure components. The method 100 may be implemented by a security vulnerability detection system comprising a processor and a memory storing instructions. In some cases, the method 100 may be implemented as instructions stored on a non-transitory computer-readable storage medium and executed by a processor.

The method 100 begins at step 102 with a binary receiver receiving an infrastructure binary associated with infrastructure components. Infrastructure components may include firmware, bootloaders, drivers, and other low-level software that interacts directly with hardware.

At step 104, the method 100 extracts the infrastructure binary using binary analysis tools. This extraction process decomposes the binary and retrieves individual executable components for further analysis.

The method 100 then applies multiple analysis techniques to the extracted binary at step 106. At step 108, a decision is made whether to decompile or emulate the binary. These techniques may include decompilation and emulation, which are performed in parallel to provide a view of the binary's structure and behavior.

Following the decompilation path, step 110 involves decompiling the binary using a rule-based decompiler. This decompiler may utilize interprocedural analysis, implement reverse engineering techniques, construct control flow graphs through parallel processing, and conduct whole-program analysis.

Alternatively, following the emulation path, step 112 involves emulating the binary within an emulation environment. This allows for observation of the binary's runtime behavior in a safe and isolated setting.

At step 114, the method 100 performs symbolic execution on the processed binary. This step explores multiple execution pathways to detect security vulnerabilities, generates inputs tailored to infrastructure components, and validates identified vulnerabilities.

Step 116 runs multiple pattern matching and analysis processes in parallel. These may include semantic pattern matching, functional similarity analysis, behavioral pattern matching, and machine learning-based classification.

The system integrates outputs from these analysis techniques into a unified model at step 118. This integration allows for a view of the binary's security profile.

The system analyzes the integrated outputs at step 120 to detect threats based on the integrated outputs. This examination leverages the combined insights from analysis techniques to identify vulnerabilities, malware and implants.

The system analyzes the integrated outputs at step 120 to detect threats based on the integrated outputs. This examination correlates findings across decompilation results, emulation traces, symbolic execution paths, and pattern matches to identify vulnerabilities, malware and implants.

At step 122, the method 100 generates a security report. This report details detected issues, severity ratings, and contextual data derived from the analysis.

Finally, at step 124, the security report is either transmitted to a remote security monitoring system or displayed on a user interface of the computing device executing the method 100. This step ensures that the results of the analysis are communicated effectively to security personnel or other relevant stakeholders.

Binary Analysis Process

Figure 2:
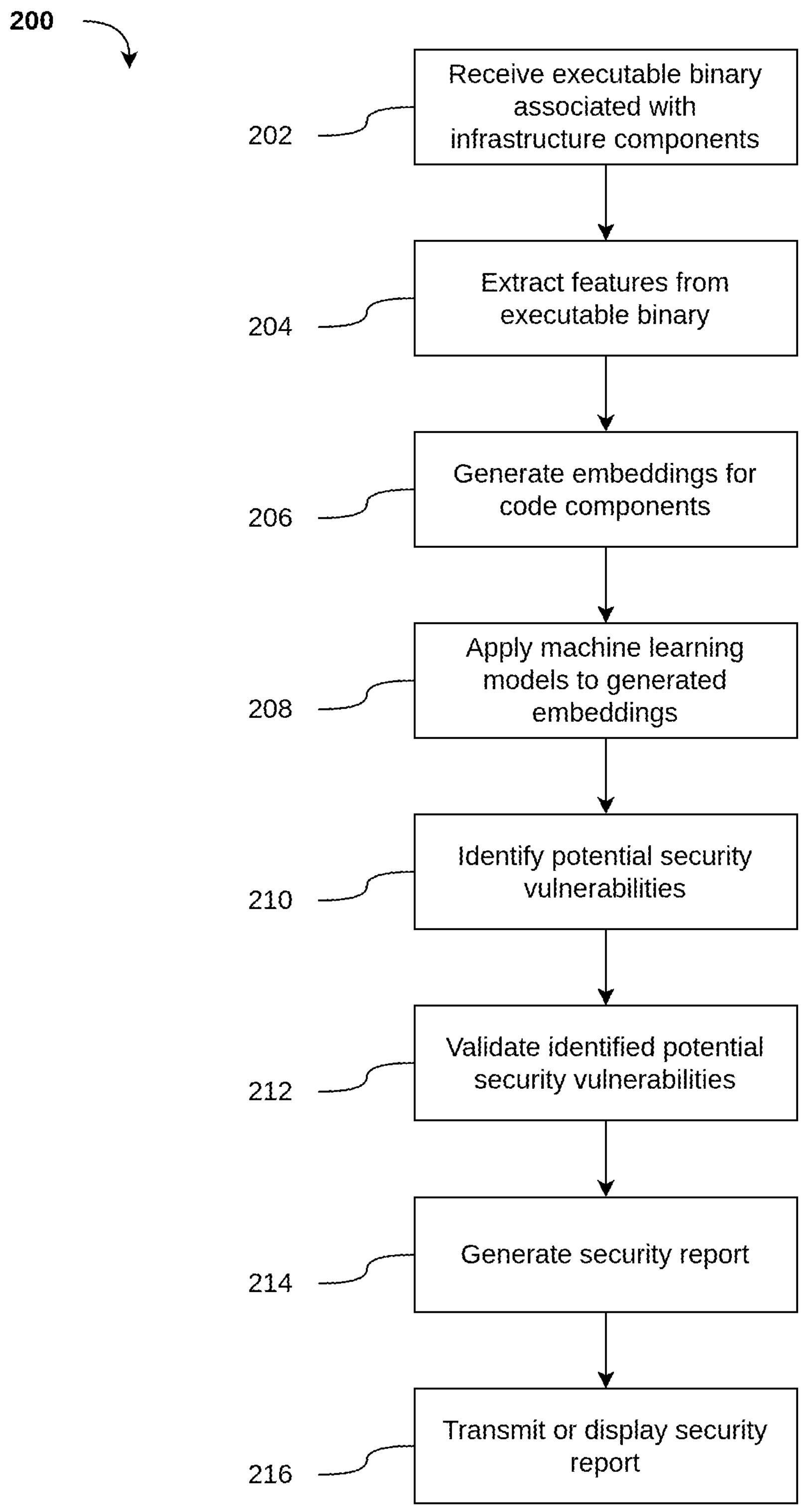
FIG. 2 depicts a flowchart for detecting security vulnerabilities in infrastructure components, according to an embodiment.

FIG. 2 illustrates a flowchart for a method 200 of detecting vulnerabilities in infrastructure components binaries. The method 200 may be implemented by a security vulnerability detection system comprising a processor and a memory storing instructions.

The method 200 begins at a step 202 with a binary receiver receiving an infrastructure binary associated with infrastructure components. Infrastructure components may include firmware, bootloaders, drivers, and other low-level software that interacts directly with hardware.

At a step 204, a binary extractor extracts the infrastructure binary using binary analysis tools. The binary extractor may employ extraction methodologies to decompose and retrieve individual executable components from the binary. This extraction process prepares the binary for subsequent analysis steps.

The binary extraction process may employ a multi-stage decomposition pipeline tailored to the hierarchical structure of infrastructure binaries. Infrastructure binaries, including firmware images, bootloaders, and device drivers, may contain nested components organized according to platform-specific formats and may employ various compression or encryption schemes that must be identified and processed prior to analysis.

The extraction methodology may begin with signature-based format detection, wherein the system scans the binary data for predefined byte patterns indicative of known container formats. These patterns may include file system headers, firmware volume signatures, executable format markers, and compression algorithm identifiers. Upon detecting a recognized signature, the system may invoke a format-specific parser to interpret the surrounding structure and extract embedded components. The signature database may include patterns for firmware volume headers, portable executable headers, terse executable headers, and embedded file system markers.

For firmware images, the extraction process may parse hierarchical container structures that organize executable modules, configuration data, and platform initialization code into nested volumes. Each volume may contain multiple files with associated metadata describing file type, compression state, and integrity verification data. The system may recursively traverse these hierarchical structures, extracting and cataloging each component for subsequent analysis. Platform-specific structures such as flash descriptor regions, platform security processor directories, and firmware file system headers may be parsed according to their respective format specifications.

The extraction pipeline may incorporate entropy analysis to identify regions of the binary that exhibit characteristics of compressed or encrypted data. Entropy calculations may be performed on fixed-size blocks throughout the binary, with the resulting entropy values used to classify regions as plaintext, executable code, compressed data, or encrypted content. Regions exhibiting entropy characteristics consistent with compression may be subjected to decompression attempts using multiple algorithm candidates, including standard compression algorithms and platform-specific compression schemes. Regions exhibiting entropy characteristics consistent with encryption may be flagged for specialized handling or exclusion from certain analysis techniques. Component classification may be performed based on detected file types, structural characteristics, and embedded metadata. The system may distinguish between platform initialization modules, runtime drivers, configuration tables, option ROMs, and other component types based on format-specific indicators. This classification may inform subsequent analysis by enabling technique selection appropriate to each component type and by identifying components that warrant elevated scrutiny due to their privileged execution context.

The method 200 proceeds to a step 206, where an embedding generator generates embeddings for code components. These embeddings may capture semantic relationships between machine instructions, represent higher-level behaviors of functions and basic blocks, and encode structural information from control flow graphs.

At a step 208, a machine learning model applier applies machine learning models to the generated embeddings. The machine learning models may include supervised classification models trained on labeled datasets of vulnerable and secure components, anomaly detection models that identify unusual code patterns, and graph neural networks that analyze relationships within code structures.

The method 200 continues to a step 210, where a vulnerability identifier identifies vulnerabilities based on outputs from the machine learning models. This step leverages the insights gained from the machine learning analysis to pinpoint areas of concern within the binary.

At a step 212, a vulnerability validator validates the identified vulnerabilities. The system uses symbolic execution or emulation to confirm the presence and exploitability of detected vulnerabilities. In some cases, a symbolic execution engine may perform symbolic execution on the processed extracted binary in parallel with decompilation and emulation processes.

The method 200 concludes with a step 214, where a security report generator generates a security report detailing the validated vulnerabilities and their severity. The report includes detected issues, severity ratings, and contextual data derived from the analysis.

In some cases, the method 200 may include additional steps not explicitly shown in FIG. 2. For example, a rule-based decompiler may decompile the extracted binary to provide a higher-level representation for analysis. Additionally, an emulation environment may emulate the extracted binary to observe runtime behavior including memory access patterns, system call sequences, and register state changes.

The method 200 may also incorporate pattern matching processes that run multiple pattern matching and analysis techniques in parallel. These processes may include semantic pattern matching, functional similarity analysis, behavioral pattern matching using LSTM networks on API call sequences, and random forest classifier trained on labeled vulnerability datasets for anomaly detection. The semantic pattern matching may utilize transformer-based language models fine-tuned on code analysis tasks to understand semantic relationships and generate contextually appropriate analysis patterns. The functional similarity analysis may employ graph neural networks to analyze code structure and generate feature vector representations (embeddings) for code segments, which are then compared against embeddings stored in a similarity database to identify functionally equivalent code segments across different implementations and compiler optimizations.

The system integrates outputs from the multiple analysis techniques, including decompilation, emulation, symbolic execution, and pattern matching. This integration combines decompilation results showing code structure, emulation traces revealing runtime behavior, symbolic execution paths identifying vulnerabilities, and pattern matches flagging known threat signatures.

The system analyzes the integrated outputs to detect threats. This examination correlates findings across decompilation results, emulation traces, symbolic execution paths, and pattern matches to identify vulnerabilities, malware and implants.

Upon completion of the analysis, the security vulnerability detection system transmits the security report to a remote security monitoring system or displays the report on a user interface of the computing device executing the method 200 at step 216. This step ensures that the results of the analysis are communicated effectively to security personnel or other relevant stakeholders.

The binary analysis process described in method 200 provides a multi-faceted approach to detecting vulnerabilities in infrastructure binaries. By combining machine learning techniques with traditional binary analysis methods, the process offers a framework for identifying and validating threats in low-level software components.

Domain-Specific Language Implementation

Figure 3:
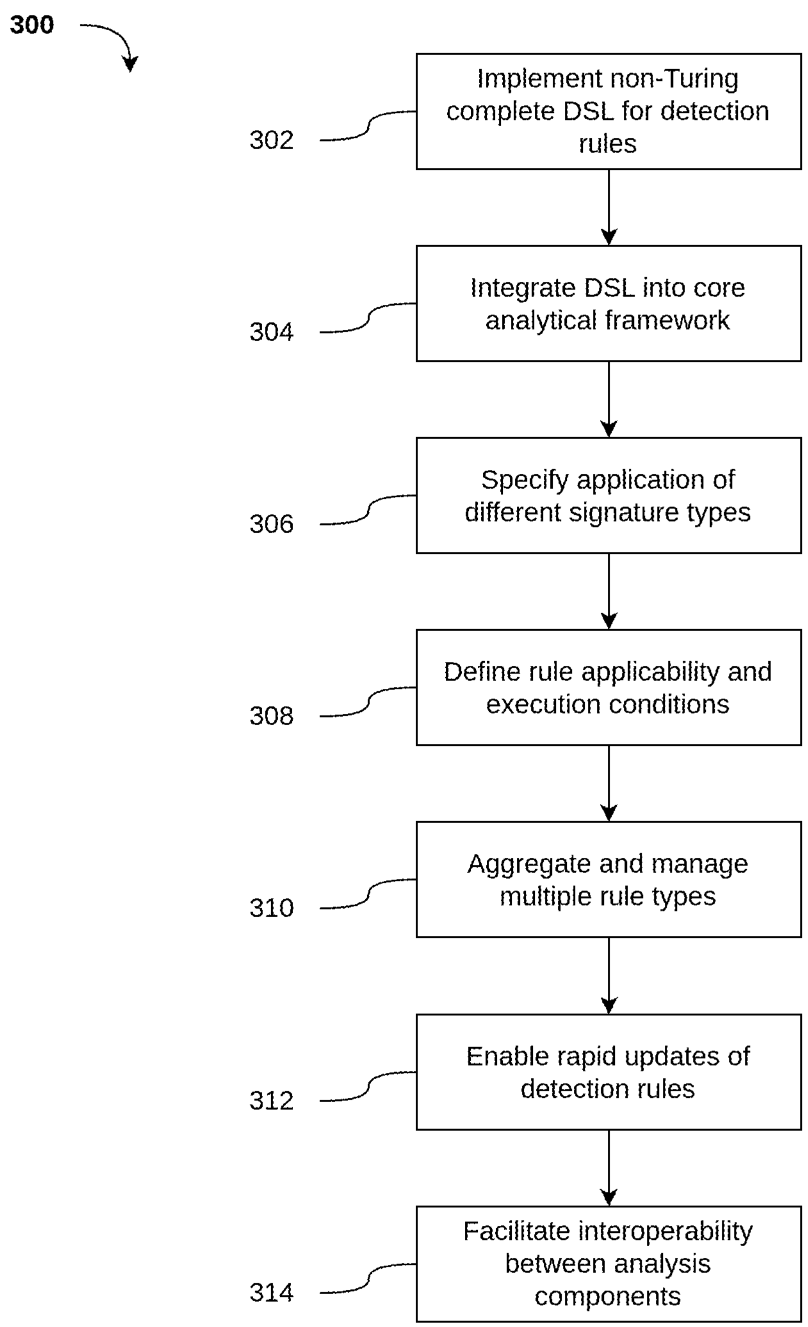
FIG. 3 shows a flowchart for implementing a domain-specific language for detection rules, in accordance with example embodiments.

FIG. 3 illustrates a flowchart for a method 300 of implementing and managing detection rules using a domain-specific language (DSL) in a security vulnerability detection system. The method 300 may be implemented by a processor executing instructions stored in a memory.

The method 300 begins at a step 302 with implementing a non-Turing complete DSL for defining detection rules. This DSL may be designed to provide a structured and constrained environment for rule creation, allowing for processing and analysis of detection rules without the full capabilities of a general-purpose programming language.

At a step 304, the method 300 integrates the DSL into a analysis pipeline. The DSL coordinates detection rule execution by specifying rule triggers, execution order, and data flow between analysis components. This includes defining how pattern matching results feed into symbolic execution, how decompilation outputs inform emulation, and how findings are combined across techniques.

The method 300 proceeds to a step 306, where the application of different signature types is specified through the DSL. This may include defining how and when various types of signatures, such as YARA rules or assembly-level patterns, are applied during the analysis process.

At a step 308, the method 300 defines rule applicability and execution conditions using the DSL. The system specifies concrete conditions for when a rule applies, such as binary type (firmware/driver), architecture (x86/ARM), or presence of specific functions or data structures. It also defines execution parameters like timeout limits, memory bounds, and thread count.

The method 300 continues to a step 310, where multiple rule types are aggregated and managed through the DSL. This may include organizing and categorizing rules based on their purpose, target components, or detection methodology.

At a step 312, the method 300 enables rapid updates of detection rules. The DSL provides a versioned rule repository, testing framework, and hot-reload capability that allows new rules to be deployed without system restarts. This enables quick response to emerging threats through rule updates that can be automatically distributed to one or more analysis instances.

At a step 314, the method 300 facilitates interoperability between analysis components. The DSL defines standard data formats and APIs that allow components to exchange analysis results, including decompiled code representations, emulation traces, symbolic execution states, and pattern matches. This enables components to build on each other's findings while maintaining loose coupling.

In some cases, the DSL includes specialized constructs for firmware analysis, such as hardware register access patterns, interrupt handler signatures, and device-specific protocol implementations. These constructs allow precise specification of rules for detecting vulnerabilities in low-level infrastructure code.

The DSL implementation provides a flexible yet controlled environment for defining detection rules. By using a non-Turing complete language with bounded loops and restricted recursion, the system can help rules complete within predictable time and memory bounds while supporting pattern matching, data flow tracking, and state machine analysis.

In some cases, the DSL includes constructs for specifying pattern matching criteria, defining data flow analyses, and describing behavioral signatures. These constructs capture hardware register access sequences, system call patterns, and firmware-specific data structure layouts through parameterized templates that can match variations of known vulnerable patterns.

The integration of the DSL into the analysis framework enables dynamic rule scheduling based on binary characteristics. The system adjusts analysis depth, parallelism, and technique selection based on binary size, complexity metrics, and initial scanning results to improve resource usage while maintaining detection coverage.

The interoperability facilitated by the DSL extends to external tools and data sources. The DSL includes interfaces for importing MITRE ATT&CK techniques, CVE details, and vendor security advisories, allowing rules to be automatically generated or updated based on new threat intelligence.

Sequence of Analysis Operations

Figure 4:
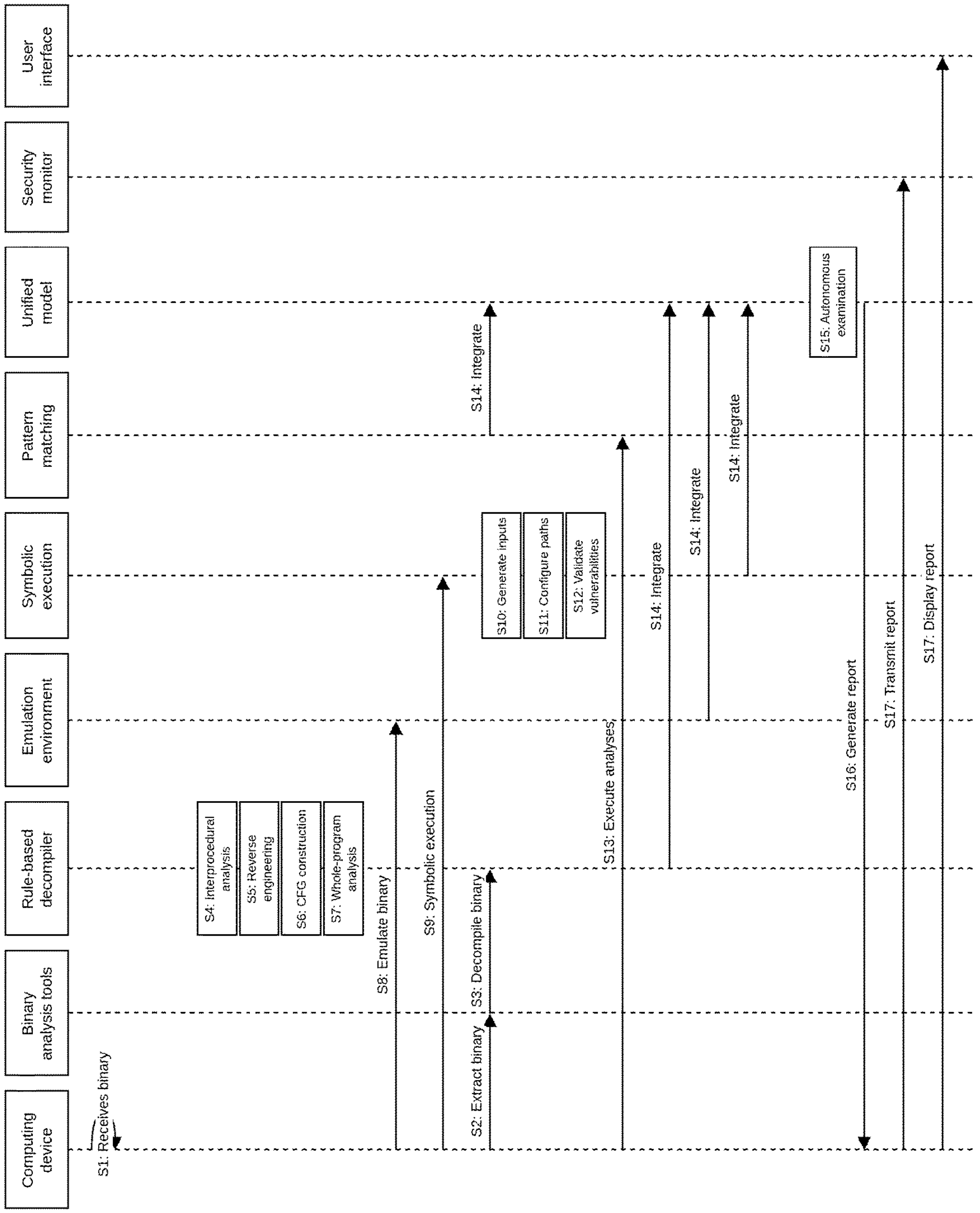
FIG. 4 illustrates a sequence diagram of interactions between components in a binary analysis framework, according to aspects of the present disclosure.

FIG. 4 depicts a sequence diagram illustrating the interaction flow between multiple system components in a binary analysis framework. The diagram shows how different components work together to analyze infrastructure code binaries for security vulnerabilities.

The sequence begins with a step S1, where a computing device receives an infrastructure binary. At a step S2, binary analysis tools extract and decompose this binary. A rule-based decompiler decompiles the extracted binary at a step S3 and initiates several parallel analysis processes.

At a step S4, the rule-based decompiler performs inter-procedural analysis to trace function calls, variable usage, and pointer references across the infrastructure components. In parallel, at a step S5, the rule-based decompiler implements reverse engineering techniques. These techniques may include type recovery through forward and backward propagation, improving the understanding of the binary's structure.

A parallel CFG constructor constructs control flow graphs (CFGs) through parallel processing mechanisms at a step S6. The parallel CFG constructor may be configured for the structured complexity and deterministic characteristics of the infrastructure components, allowing for analysis of large binaries while improving scalability.

At a step S7, the rule-based decompiler conducts whole-program analysis to detect cross-function behaviors indicative of vulnerabilities, malware and implants. This analysis provides a view of the binary's functionality and threats.

In parallel with the decompilation processes, an emulation environment emulates the extracted binary at a step S8. This emulation allows for observation of the binary's runtime behavior in a safe and isolated setting.

A symbolic execution engine performs symbolic execution at a step S9. The symbolic execution engine generates inputs and explores execution pathways at step S10. The symbolic execution engine generates symbolic inputs specifically designed for infrastructure components.

At a step S11, the symbolic execution engine configures execution paths with CFG generation and state management. This step involves bounded execution paths and state management techniques optimized for infrastructure components. At a step S12, the symbolic execution engine validates identified vulnerabilities, determining their exploitability within the specific context of the infrastructure components.

The system then runs multiple analyses at a step S13. These analyses may include semantic pattern matching, functional similarity analysis, behavioral pattern matching, and machine learning-based classification. A functional similarity analyzer may generate feature vector representations (embeddings) from the extracted binary and compare them against embeddings stored in a similarity database to identify similar functionality patterns and common vulnerabilities.

At a step S14, the system integrates outputs across different components including the pattern matching processes, symbolic execution engine, and a unified model. This integration allows for a view of the binary's security profile, combining insights from analysis techniques.

An examiner conducts an examination of the integrated outputs at a step S15. The examiner correlates findings across the multiple analysis techniques by comparing decompilation results with emulation traces, cross-referencing symbolic execution paths with pattern matches, and identifying consistent threat indicators across different analysis methods to reduce false positives and improve detection accuracy.

The sequence concludes with a step S16, where a security report generator generates a security report. The security report generator includes information about which specific combination of the multiple analysis techniques contributed to detections, specifying whether threats were identified through decompilation analysis, emulation behavior, symbolic execution paths, or pattern matching signatures.

Finally, at a step S17, the system transmits the security report to a remote security monitoring system and displays it on a user interface. This step ensures that the results of the analysis are communicated effectively to security personnel or other relevant stakeholders.

In some cases, a random forest classifier trained on labeled infrastructure component datasets for anomaly detection may be used to identify anomalous code patterns and security threats. This approach may complement the other analysis techniques, providing additional insights into the binary's security profile.

The sequence of operations depicted in FIG. 4 demonstrates the interplay between various analysis components in the binary analysis framework. By combining multiple analysis techniques, including decompilation, emulation, symbolic execution, and machine learning, the system may provide a thorough and multi-faceted analysis of infrastructure binaries, improving its ability to detect vulnerabilities and malicious code.

Detailed Analysis Workflow

Figure 5:
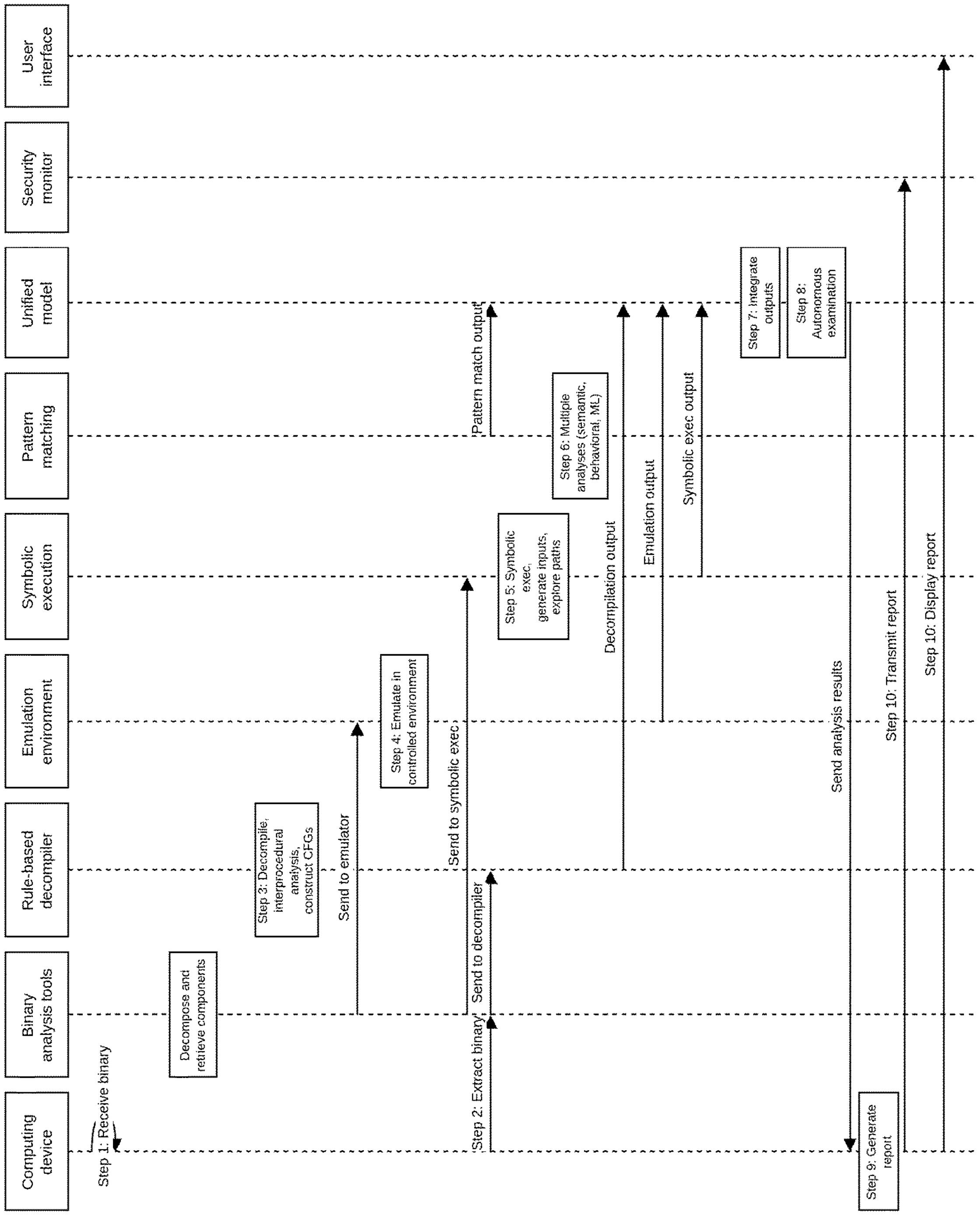
FIG. 5 depicts a flowchart for detecting security vulnerabilities in binary code, according to an embodiment.
Figure 6:
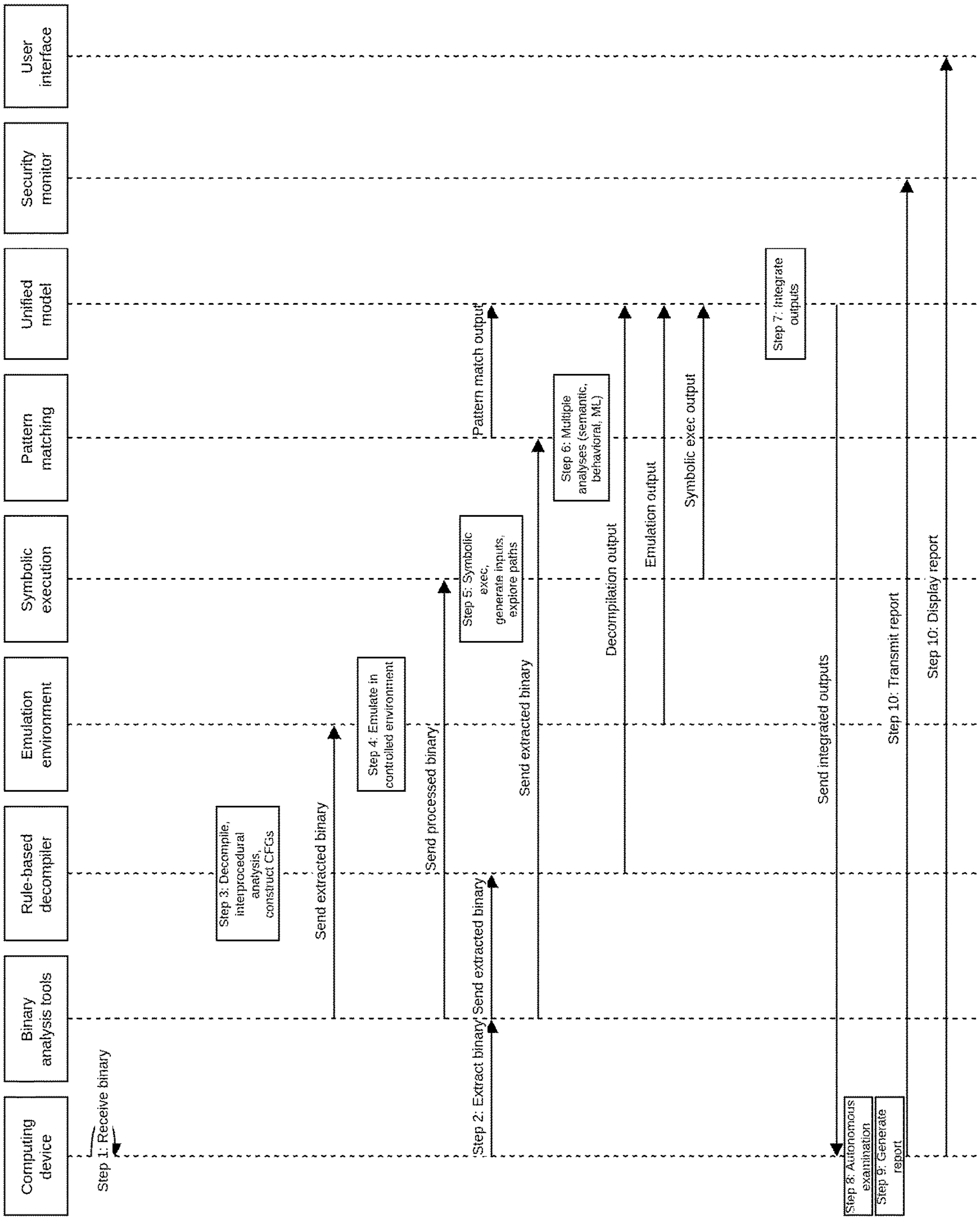
FIG. 6 illustrates another flowchart for detecting security vulnerabilities in binary code, in accordance with example embodiments.

FIG. 5 and FIG. 6 illustrate flowcharts depicting methods for detecting security vulnerabilities in binary code associated with infrastructure components. These methods may be implemented by a security vulnerability detection system comprising a processor and a memory storing instructions.

The process begins with a computing device receiving an infrastructure binary associated with infrastructure components. Binary analysis tools may then extract and decompose this binary to retrieve individual executable components for further analysis.

In some cases, a rule-based decompiler decompiles the extracted binary. The rule-based decompiler utilizes inter-procedural analysis to trace function calls, variable usage, and pointer references across the infrastructure components. This decompiler improves the overall accuracy of the analysis process by providing a more structured representation of the binary code. The decompiler uses convolutional neural networks trained on large datasets of compiled code for pattern recognition, reconstructing high-level code semantics from low-level binary representations. The decompiler employs neural networks trained on large datasets of compiled code to recognize common programming patterns and idioms, decompiling optimized and obfuscated code.

The rule-based decompiler incorporates a runtime engine that performs analysis. This analysis includes forward and backward type propagation, taint analysis, type recovery, type discovery, and backtracking-based inference. The runtime engine refines its analysis by iteratively resolving ambiguous or code patterns.

In some cases, the rule-based decompiler applies convolutional neural networks trained on disassembled firmware datasets for binary classification to identify and reconstruct high-level control structures specific to the infrastructure components. These models recognize patterns common in firmware, drivers, and other low-level software components.

The convolutional neural networks employed for type recovery and discovery may utilize a multi-layer architecture specifically designed for processing sequential instruction data. In some cases, the CNN architecture may comprise an input layer that accepts fixed-length windows of disassembled instruction sequences encoded as one-hot vectors or learned embeddings, followed by multiple convolutional layers with kernel sizes ranging from 3 to 7 instructions to capture local instruction patterns. The convolutional layers may employ dilated convolutions with exponentially increasing dilation rates to expand the receptive field without increasing parameter count, enabling the network to recognize patterns spanning dozens of instructions.

Batch normalization and ReLU activation functions may be applied between convolutional layers to improve training stability. The network may include residual connections to facilitate gradient flow in deeper architectures. Global average pooling may be applied before fully connected classification layers that output probability distributions over candidate data types including primitive types such as int8, int16, int32, int64, float32, float64, and char, as well as composite types such as structures, arrays, and function pointers. The training dataset may comprise labeled examples extracted from binaries compiled with debug symbols, where the ground truth types are obtained from DWARF debugging information and mapped to the corresponding disassembled instruction sequences that access typed variables.

The decompiler generates a refined intermediate representation of the extracted binary. This refined representation is optimized for compatibility with subsequent analysis stages, including syntactic matching, semantic detection, and behavioral pattern matching.

In parallel with the decompilation process, the extracted binary is emulated within an emulation environment. This emulation observes the binary's runtime behavior in a safe and isolated setting, revealing insights that are not apparent from static analysis alone.

A symbolic execution engine performs symbolic execution on the processed extracted binary. The system generates symbolic inputs designed for the operational characteristics of infrastructure components. The symbolic execution engine explores multiple execution paths to detect vulnerabilities, such as buffer overflows or unauthorized access. The symbolic execution engine uses constraint solving techniques using satisfiability modulo theories (SMT) solvers to explore execution paths and identify feasible vulnerability conditions. The engine employs path pruning strategies to focus computational resources on the more promising execution paths, utilizing heuristics based on code complexity, data flow patterns, and historical vulnerability patterns to guide path selection.

The symbolic execution engine may formulate constraints in the quantifier-free theories supported by modern SMT solvers, including the theory of fixed-width bit-vectors (QF_BV) for modeling integer and pointer arithmetic, the theory of arrays (QF_ABV) for modeling memory operations, and the theory of uninterpreted functions for abstracting operations. Arithmetic constraints may be expressed in bit-vector arithmetic with precise overflow semantics matching the target architecture, such that a 32-bit addition producing a value exceeding 2^32-1 wraps according to two's complement semantics. Memory operations may be modeled using the array theory with read and write operations; for example, a store of value v to address a in memory state M may produce a new memory state M'=store(M, a, v), and a subsequent load from address a' may be expressed as select(M', a') with the solver determining whether a equals a' under the current path constraints.

Pointer aliasing queries may be formulated as satisfiability checks of the form (ptr1=ptr2)/\path_constraints to determine whether two pointers may reference the same memory location. The engine may employ incremental solving, maintaining the solver state across related queries and using push/pop operations to explore branch conditions. For vulnerability detection, the engine may check satisfiability of constraints representing error conditions, such as (buffer_ptr+offset>buffer_end) for buffer overflows or (divisor=0) for divide-by-zero errors.

The security vulnerability detection system runs multiple pattern matching and analysis processes in parallel. These processes include semantic pattern matching, functional similarity analysis, behavioral pattern matching using LSTM networks on API call sequences, and random forest classifier trained on labeled vulnerability datasets for anomaly detection.

A semantic pattern matching uses e-graph-based representation and static single assignment (SSA) form to detect semantically equivalent code patterns. This approach identifies vulnerabilities or malicious artifacts abstracted from register naming, instruction ordering, or compiler-specific optimizations. In some cases, the semantic pattern matching integrates a BERT-based language model fine-tuned on decompiled code datasets that improves pattern recognition capabilities by detecting specific markers and indicators in decompiled code. The BERT-based model enables the semantic pattern matching to identify vulnerability signatures, recognize malicious code patterns, and adapt pattern matching strategies based on evolving threat landscapes.

The semantic pattern matching may employ e-graph rewriting techniques to construct equivalence classes of program expressions, enabling identification of vulnerabilities or malicious artifacts abstracted from register naming, instruction ordering, or compiler-specific optimization. This approach may facilitate analysis across different programming languages including C, C++, and others that can be transformed into the SSA-based intermediate representations. The system may enable a rule DSL to define semantic patterns in terms of e-graph constructs, providing a high-level interface for expressing rule logic grounded in formal semantics rather than surface syntax.

The pattern matching processes may include a parametric interprocedural analysis layer configured to statically resolve indirect function calls, function pointer references, and modular control-flow structures across multiple functions and compilation units. This layer may utilize parameters to bound analysis scope, enabling feasible execution within time and memory constraints.

The parametric interprocedural analysis layer may enable identification of vulnerability classes, including function pointer hijacking, control-flow manipulation, and code-reuse strategies, through precise interprocedural tracking mechanisms. The system may integrate C-based syntactic pattern matching with interprocedural control-flow analysis through programmatic processing, eliminating manual code auditing and enabling fully automated threat detection cycles in embedded and low-level software domains.

A whole-program analyzer may construct a program dependence graph that combines control and data dependencies across the extracted binary. This graph may synthesize control and data dependencies into a unified representation that models the binary's behavior, capturing interactions between firmware components and driver routines. The whole-program analyzer may incorporate graph analysis techniques including centrality measures, community detection algorithms, and graph neural networks to identify code components and vulnerability hotspots. The analyzer may employ dataflow analysis techniques such as reaching definitions, live variable analysis, and available expressions analysis to understand how data flows through the program and identify security-relevant data dependencies.

The whole-program analyzer may apply abstract interpretation techniques with custom abstract domains adapted to common firmware and driver data types. These custom domains may be tailored to hardware register values, memory-mapped I/O operations, and device-specific data structures, reflecting the constraints of embedded system memory layouts and their interactions with control flow and data operations. The analyzer may utilize a semantic pattern matching with a BERT-based language model fine-tuned on infrastructure code to abstract high-level code behaviors and identify semantic constructs specific to infrastructure components.

The whole-program analyzer may apply abstract interpretation techniques with custom abstract domains adapted to common firmware and driver data types. These custom domains may be tailored to hardware register values, memory-mapped I/O operations, and device-specific data structures, reflecting the constraints of embedded system memory layouts and their interactions with control flow and data operations.

In some cases, the whole-program analyzer may apply graph neural networks to analyze the program dependence graph. This approach may enable the identification of patterns and relationships that may indicate vulnerabilities or malicious code structures.

The outputs from these analysis techniques may be integrated into a unified model. This integration allows for a view of the binary's security profile, combining insights from decompilation, emulation, symbolic execution, and pattern matching processes.

ABRAM System Architecture

The Advanced Binary Rule Analysis Modules (ABRAM) system may serve as the orchestration framework for integrating multiple analysis techniques and pattern matching engines. The ABRAM system may receive binary input and coordinate the processing through various specialized components including decompilers, disassemblers, emulators, signature scanners, and symbolic execution engines. Components within the ABRAM framework may be configured to operate on infrastructure code with specific optimizations for firmware, bootloaders, and drivers.

The ABRAM system may incorporate an allowlist checker that performs initial binary validation before routing the binary to appropriate analysis components. The system may include a Decompiler ARES (Rule Engineering System) that processes binaries using rule-based transformation frameworks. A GNU binutils disassembler may provide low-level assembly analysis capabilities, while a Qiling emulator may enable dynamic analysis within emulation environments.

The ABRAM framework may integrate multiple pattern databases and models that support the analysis components. These may include semantic patterns processed by SAME (Semantic Analysis Meta Engine) matchers, C patterns handled by Weggli analyzers, assembly patterns processed by JASM (Just Another Syntax Matcher) components, and behavioral patterns analyzed by RuDA (Rule-based Driver Analysis) modules. The system may also incorporate symbolic patterns processed by DANGR (Dynamic Analysis for Next-Generation Reverse engineering) matchers and binary/GUID patterns for pattern recognition.

The ABRAM system may implement a functional similarity engine that generates feature vector representations (embeddings) for code segments and compares these embeddings against a database of stored embeddings to identify similar code patterns. The system may produce various output types including code programs, semantic patterns, behavior patterns, and symbolic patterns that feed into the unified model for threat detection and vulnerability assessment.

The system analyzes the integrated outputs to detect threats based on the integrated outputs. This examination may leverage the combined insights from multiple analysis techniques to identify vulnerabilities, malware and implants within the infrastructure binary.

The security vulnerability detection system generates a security report detailing detected issues, severity ratings, and contextual data derived from the analysis. This report is transmitted to a remote security monitoring system or displayed on a user interface of the computing device executing the analysis.

Infrastructure Code Optimization Techniques

The security vulnerability detection system may leverage the specific characteristics of infrastructure code to improve analysis performance and accuracy. Infrastructure code, including firmware, bootloaders, and drivers, may exhibit similarity and predictable behavior patterns due to their role in managing low-level system resources. The system may exploit these characteristics by implementing specialized analysis techniques that take advantage of the limited execution paths, component reuse, and deterministic behavior typical of infrastructure components.

The system may implement similarity-based optimizations that recognize common patterns in infrastructure code implementations. For example, USB driver implementations may follow similar architectural patterns across different manufacturers, enabling the system to apply learned knowledge from analyzing one USB driver to improve analysis of related drivers. The system may maintain databases of known infrastructure component patterns, including TCP/IP stack implementations, hardware communication protocols, and device management routines.

The analysis system may employ domain-specific optimizations for different types of infrastructure binaries. UEFI firmware analysis may utilize specialized knowledge of UEFI protocols and boot sequences, while device driver analysis may focus on kernel interaction patterns and hardware register manipulation. The system may implement platform-specific rule sets that account for the specific characteristics of different operating environments, including Windows kernel space, Linux user space, and embedded system environments.

The detailed analysis workflow described in FIG. 5 and FIG. 6 provides a multi-faceted approach to detecting vulnerabilities in infrastructure binaries. By combining decompilation techniques, emulation, symbolic execution, and various pattern matching processes, the system offers a framework for identifying and validating threats in low-level software components.

Security Vulnerability Detection System Architecture

Figure 7:
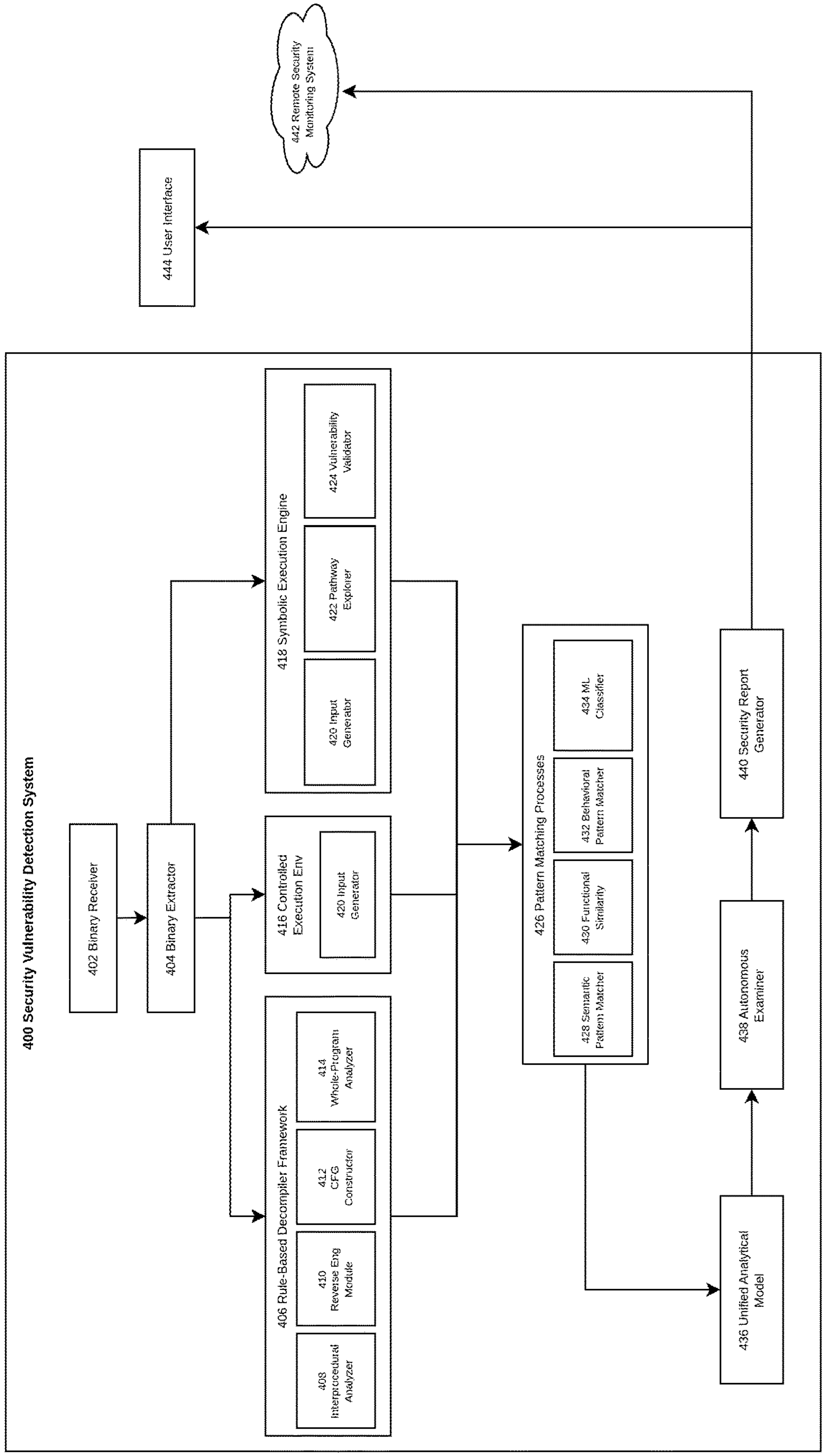
FIG. 7 shows a block diagram of a security vulnerability detection system, according to aspects of the present disclosure.

FIG. 7 illustrates a Security Vulnerability Detection System 400 for analyzing infrastructure code binaries and identifying vulnerabilities. The Security Vulnerability Detection System 400 may comprise multiple interconnected components that work together to provide analysis and detection capabilities.

A Binary Receiver 402 may receive an infrastructure binary associated with infrastructure components. The Binary Receiver 402 may be configured to accept various types of binary files, including firmware images, driver binaries, and bootloader code.

Upon receiving the binary, a Binary Extractor 404 may extract and decompose the infrastructure binary using binary analysis tools. The Binary Extractor 404 may retrieve individual executable components from the binary, preparing them for subsequent analysis stages.

A Rule-Based Decompiler 406 may process the extracted binary components. The Rule-Based Decompiler 406 may include several subcomponents that perform specialized analysis tasks. An Interprocedural Analyzer 408 may trace function calls, variable usage, and pointer references across the infrastructure components. This analysis may provide insights into the binary's control flow and data dependencies.

A Reverse Engineering Module 410 may implement techniques for understanding the binary's structure and behavior. In some cases, the Reverse Engineering Module 410 may utilize convolutional neural networks trained on diverse firmware and driver datasets for binary classification to recognize patterns and architectural elements specific to firmware, drivers, and bootloaders.

A Parallel CFG Constructor 412 may construct control flow graphs (CFGs) through parallel processing mechanisms. The Parallel CFG Constructor 412 may be configured for the structured complexity and deterministic characteristics of infrastructure components, enabling analysis of large binaries.

The parallel CFG construction algorithm may partition the binary into independent analysis units that can be processed concurrently. In a first phase, a linear scan may identify function boundaries using prologue and epilogue signatures, call target analysis, and exception handling table parsing; this phase may execute in O(n) time where n is the binary size. In a second phase, each identified function may be assigned to a worker thread from a thread pool for independent CFG construction. Within each function, the algorithm may perform recursive descent disassembly starting from the function entry point, identifying basic block boundaries at branch targets and fall-through points after conditional jumps. To handle indirect jumps and calls, the algorithm may employ value set analysis within each function to resolve jump table targets and virtual function call destinations.

Cross-function edges may be added in a subsequent merge phase that operates on the completed per-function CFGs. The parallelization may achieve near-linear speedup for binaries with many functions by minimizing synchronization; synchronization points may be limited to the initial function boundary identification phase and the final edge merge phase. For binaries with interconnected functions or extensive use of indirect control flow, the algorithm may fall back to a more conservative sequential analysis mode to help ensure correctness.

A Whole-Program Analyzer 414 may conduct analysis to detect cross-function behaviors indicative of vulnerabilities, malware and implants. The Whole-Program Analyzer 414 may provide a holistic view of the binary's functionality and threats.

In some cases, the Rule-Based Decompiler 406 may introduce a decompiler designed to utilize platform-specific rules. This decompiler may enhance the system's ability to accurately analyze binaries from various platforms and architectures.

The Rule-Based Decompiler 406 may implement a de-optimizer module within the decompiler. This de-optimizer module may be specifically designed to reverse compiler optimizations such as loop constructs, enabling the recovery of high-level code patterns that may have been obscured by optimization techniques.

In some cases, the Rule-Based Decompiler 406 may provide a compiler that translates platform-specific rules into executable decompilation components. This feature may allow for rapid deployment of decompilation strategies tailored to specific architectures and platforms.

An Emulation Environment 416 may emulate the extracted binary to observe its runtime behavior in a safe and isolated setting. The Emulation Environment 416 may include an Input Generator 420 for generating inputs for emulation. The Emulation Environment 416 may provide valuable insights into the binary's dynamic behavior that may not be apparent from static analysis alone.

A Symbolic Execution Engine 418 may perform symbolic execution on the processed extracted binary. The Symbolic Execution Engine 418 may include an Input Generator 420 that creates symbolically determined inputs tailored to infrastructure components. An Execution Pathway Explorer 422 may explore diverse execution pathways to detect security vulnerabilities. A Vulnerability Validator 424 may validate identified vulnerabilities to ascertain their exploitability within the specific context of the infrastructure components.

The Security Vulnerability Detection System 400 may incorporate Pattern Matching Processes 426 that execute multiple analysis techniques simultaneously. A Semantic Pattern Matcher 428 may identify code patterns based on semantic features. A Functional Similarity Analyzer 430 may compare code segments to known vulnerable or benign code. A Behavioral Pattern Matcher 432 may analyze sequences of operations to detect malicious artifacts. A Machine Learning Classifier 434 may utilize neural networks or other machine learning models to identify anomalous code patterns and threats.

The Security Vulnerability Detection System 400 may incorporate Pattern Matching Processes 426 that run multiple analysis techniques in parallel. A Semantic Pattern Matcher 428 may identify code patterns based on semantic features. A Functional Similarity Analyzer 430 may compare code segments to known vulnerable or benign code. A Behavioral Pattern Matcher 432 may analyze sequences of operations using LSTM networks on API call sequences to detect malicious artifacts. A Machine Learning Classifier 434 may utilize random forest models trained on labeled vulnerability datasets for anomaly detection to identify anomalous code patterns and threats.

A Security Report Generator 440 creates a security report detailing detected issues, severity ratings, and contextual data derived from the analysis. The Security Report Generator 440 transmits the report to a Remote Security Monitoring System 442 or displays it on a User Interface 444 of the computing device executing the analysis.

The Security Vulnerability Detection System 400 architecture enables a multi-faceted approach to analyzing infrastructure binaries. By combining decompilation techniques, emulation, symbolic execution, and various pattern matching processes, the system may provide detection capabilities for identifying vulnerabilities in low-level software components.

Machine Learning-Based Vulnerability Detection

Figure 8:
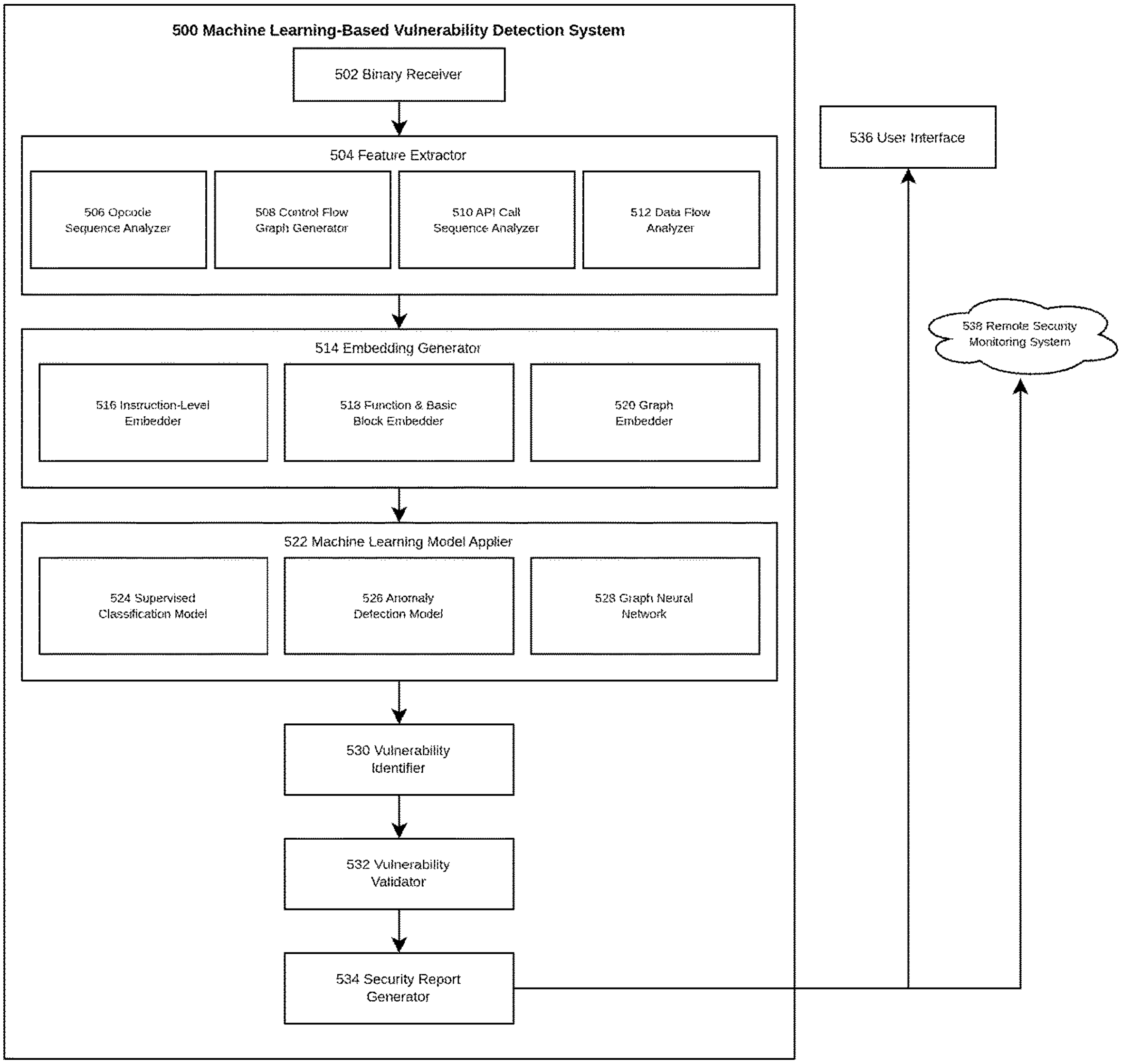
FIG. 8 depicts a block diagram of a machine learning-based vulnerability detection system, according to an embodiment.

FIG. 8 illustrates a block diagram of a Machine Learning-Based Vulnerability Detection System 500 for analyzing infrastructure code binaries and identifying vulnerabilities. The Machine Learning-Based Vulnerability Detection System 500 may leverage advanced machine learning techniques to enhance the detection capabilities of the Security Vulnerability Detection System 400.

A Binary Receiver 502 may receive an infrastructure binary associated with infrastructure components. The Binary Receiver 502 may be configured to accept various types of binary files, including firmware images, driver binaries, and bootloader code.

Upon receiving the binary, a Feature Extractor 504 may extract relevant features from the infrastructure binary. The Feature Extractor 504 may comprise several specialized components for analyzing different aspects of the binary code.

An Opcode Sequence Analyzer 506 may examine the sequences and patterns of machine instructions within the binary. This analysis may provide insights into the low-level behavior of the code and may help identify malicious or vulnerable instruction patterns.

A Control Flow Graph Generator 508 may construct graph representations of the binary's control flow. These graphs may capture the logical structure and execution paths within the code, enabling more analysis of the binary's behavior.

An API Call Sequence Analyzer 510 may examine the sequences and patterns of API calls made by the binary. This analysis may help identify suspicious or malicious interactions with system resources or libraries.

A Data Flow Analyzer 512 may trace the flow of data through the binary, examining how variables and memory locations are used and modified. This analysis may help identify vulnerabilities related to data handling, such as buffer overflows or use-after-free errors.

An Embedding Generator 514 may create vector representations of various code components extracted from the binary. The Embedding Generator 514 may comprise several specialized embedding techniques designed for different levels of code abstraction.

An Instruction-Level Embedder 516 may generate embeddings for individual machine instructions or small sequences of instructions. These embeddings may capture semantic relationships between different types of instructions, enabling more nuanced analysis of low-level code patterns.

A Function and Basic Block Embedder 518 may create embeddings for larger code structures such as functions or basic blocks. These embeddings may represent higher-level behaviors and characteristics of the code, allowing for analysis of functional similarities or anomalies.

A Graph Embedder 520 may generate embeddings that capture structural information from control flow graphs or other graph-based representations of the code. These embeddings may enable analysis of the overall structure and organization of the binary.

A Machine Learning Model Applier 522 may apply various machine learning models to the generated embeddings and extracted features. The Machine Learning Model Applier 522 may incorporate several types of models designed to detect different classes of vulnerabilities or anomalies.

A Supervised Classification Model 524 may be trained on labeled datasets of vulnerable and secure code components. This model may classify new code samples as vulnerable or secure based on learned patterns from the training data.

An Anomaly Detection Model 526 may identify unusual or suspicious code patterns that deviate from expected norms. This model may be particularly effective at detecting novel or previously unseen vulnerabilities.

A Graph Neural Network 528 may analyze relationships within code structures, leveraging the graph-based representations generated earlier in the pipeline. This model may be capable of detecting vulnerability patterns that span multiple functions or modules.

A Vulnerability Identifier 530 may process the outputs from the various machine learning models to identify vulnerabilities in the analyzed binary. The Vulnerability Identifier 530 may correlate findings from different models and apply heuristics to prioritize and categorize detected issues.

A Vulnerability Validator 532 may attempt to confirm or refute vulnerabilities identified by the machine learning models. In some cases, the Vulnerability Validator 532 may compile and execute suspected vulnerable functions with instrumentation in a controlled environment. This approach may help reduce false positives by verifying the exploitability of detected vulnerabilities.

A Security Report Generator 534 creates a security report detailing the identified vulnerabilities, their severity, and contextual data derived from the machine learning analysis. The Security Report Generator 534 transmits the report to a Remote Security Monitoring System 536 or displays it on a User Interface 538 of the computing device executing the analysis.

In some cases, the Machine Learning-Based Vulnerability Detection System 500 may incorporate a functionality classifier within the Machine Learning Model Applier 522. This functionality classifier may categorize binary components based on their functional characteristics using convolutional neural networks trained on diverse firmware and driver datasets for multi-class classification. The classifier may help identify the operational purpose of proprietary or opaque binaries by analyzing imported and exported functions, symbols, and protocol implementations. The functionality classifier may employ deep learning architectures such as convolutional neural networks (CNNs) for analyzing binary patterns, recurrent neural networks (RNNs) for processing sequential instruction patterns, and transformer models for understanding code relationships. The classifier may maintain a hierarchical taxonomy of binary functions, enabling fine-grained categorization from broad functional categories down to specific operational behaviors. This classification capability may enhance the overall analysis process by providing contextual information that guides subsequent vulnerability detection efforts and helps prioritize analysis resources based on the criticality and exposure risk of different functional components.

The Emulation Environment 416 of the Security Vulnerability Detection System 400 may include an emulation-based analysis system that works in conjunction with the Machine Learning-Based Vulnerability Detection System 500. This emulation-based system may utilize emulation frameworks to simulate execution environments for various infrastructure component types, including UEFI firmware, device drivers, and bootloaders. The emulation-based system may conduct targeted fuzzing by generating inputs designed to trigger vulnerabilities in high-risk code areas identified by the machine learning models. The targeted fuzzing approach may employ coverage-guided fuzzing techniques that prioritize code paths with higher vulnerability likelihood, as determined by static analysis and machine learning predictions. The emulation environment may support multiple processor architectures including x86, x64, ARM, and RISC-V, enabling analysis of diverse infrastructure components. The system may implement hardware abstraction layers that simulate specific hardware interfaces and peripheral devices, allowing for accurate emulation of firmware behavior in realistic execution contexts.

In some cases, the Pattern Matching Processes 426 of the Security Vulnerability Detection System 400 may include a bioinformatics-inspired vulnerability detection system that complements the machine learning approach. This system may apply a data encoding modulation method to convert assembly mnemonics to a biological alphabet, enabling the use of multiple sequence alignment techniques for identifying vulnerabilities without relying on specific version signatures. The bioinformatics-inspired system may utilize phylogenetic algorithms to cluster binaries into related "clades," enabling comparison of related binaries and calculating a signal-to-noise ratio to exclude unrelated code paths. The phylogenetic analysis may construct evolutionary trees of binary relationships, allowing for the identification of common ancestral vulnerabilities and the tracking of malware evolution patterns. This approach may enable the detection of variant malware families that share common genetic markers while exhibiting different surface-level characteristics. The system may employ sequence alignment algorithms such as BLAST (Basic Local Alignment Search Tool) adapted for binary code analysis, enabling identification of similar code segments across large binary datasets.

The Machine Learning-Based Vulnerability Detection System 500 may provide a complement to traditional binary analysis techniques. By leveraging machine learning models and specialized code representations, the system may be capable of detecting subtle vulnerabilities that may be difficult to identify through conventional means. The integration of machine learning with emulation-based analysis and bioinformatics-inspired techniques may offer an approach to securing infrastructure components.

Client Computing Architecture

Figure 9:
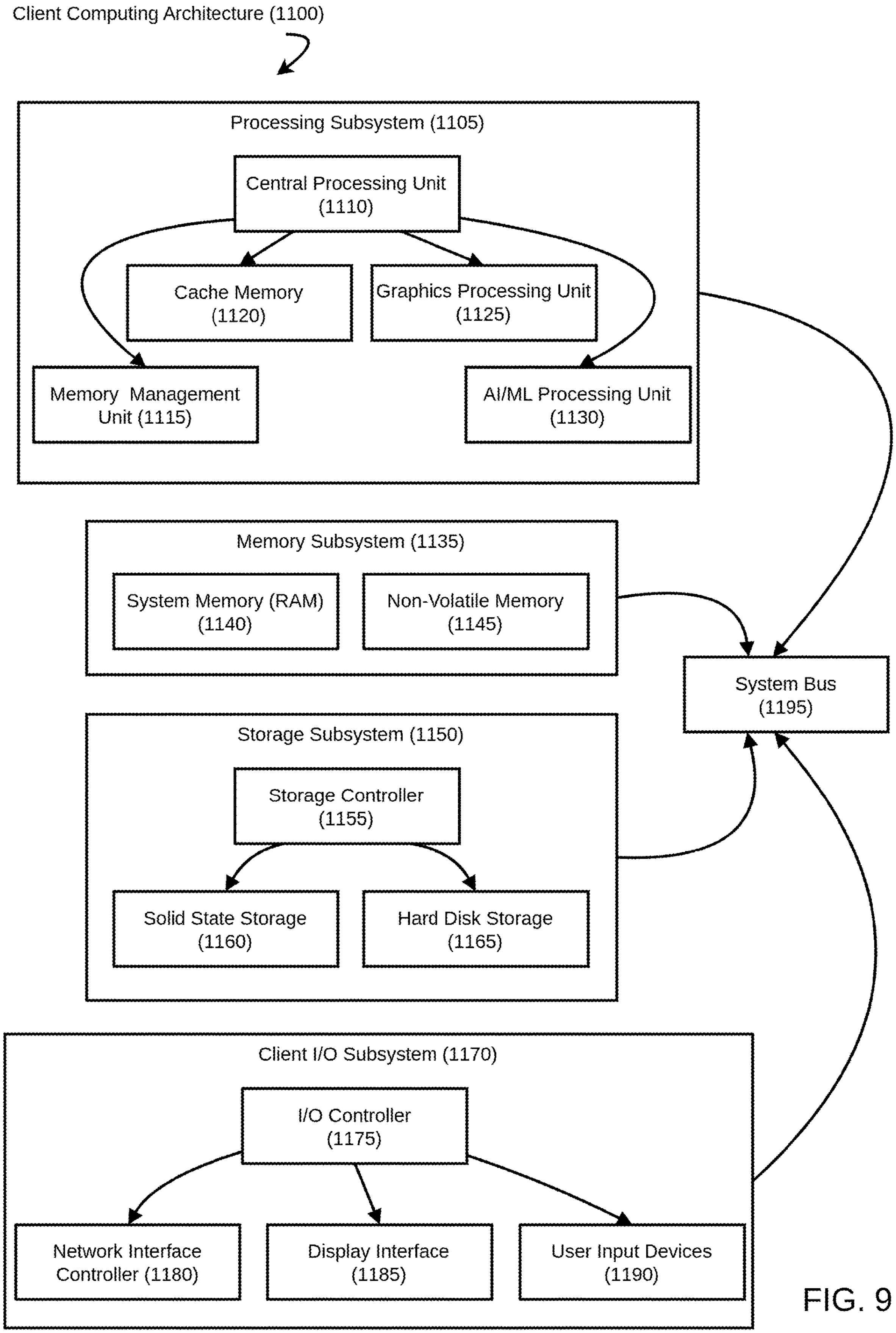
FIG. 9 illustrates a block diagram of a client computing architecture, in accordance with example embodiments.

FIG. 9 illustrates a Client Computing Architecture 1100 that may be used to implement the Security Vulnerability Detection System 400 or the Machine Learning-Based Vulnerability Detection System 500. The Client Computing Architecture 1100 comprises several interconnected subsystems and components that work together to perform binary analysis and vulnerability detection tasks.

A Processing Subsystem 1105 forms the core of the Client Computing Architecture 1100. The Processing Subsystem 1105 includes a Central Processing Unit 1110 that executes instructions and performs calculations for binary analysis and vulnerability detection. A Memory Management Unit 1115 manages the allocation and deallocation of memory resources, which may be for efficient processing of large binary files. Cache Memory 1120 provides fast access to frequently used data and instructions, improving the performance of repetitive analysis tasks.

In some cases, the Processing Subsystem 1105 may include specialized processing units. A Graphics Processing Unit 1125 may accelerate parallel computing tasks, such as those involved in pattern matching or machine learning model inference. An AI/ML Processing Unit 1130 may be designed to improve the execution of machine learning algorithms used in vulnerability detection.

A Memory Subsystem 1135 provides storage for data and instructions during the analysis process. System Memory (RAM) 1140 offers high-speed volatile storage for active processes and data. Non-Volatile Memory 1145 may store persistent data, such as analysis results or machine learning model parameters.

A Storage Subsystem 1150 provides longer-term storage capabilities. A Storage Controller 1155 manages data access and storage operations. Solid State Storage 1160 may offer fast read and write speeds for frequently accessed data, while Hard Disk Storage 1165 may provide larger capacity for storing extensive binary datasets or analysis results.

A Client I/O Subsystem 1170 facilitates communication with external devices and user interaction. An I/O Controller 1175 manages various input and output operations. A Network Interface Controller 1180 enables communication with remote systems, which may be useful for accessing distributed computing resources or sharing analysis results. A Display Interface 1185 allows for the visualization of analysis progress and results. User Input Devices 1190 enable interaction with the system, allowing analysts to configure analysis parameters or review detection outcomes.

A System Bus 1195 interconnects these subsystems, facilitating data transfer and communication between components. The System Bus 1195 may play a role in helping to ensure data flow during analysis tasks.

In some cases, the Client Computing Architecture 1100 may be configured for specific vulnerability detection tasks. For example, the Central Processing Unit 1110 may be selected for its ability to handle symbolic execution operations. The Memory Subsystem 1135 may be sized to accommodate large binary files and intermediate analysis results.

The Storage Subsystem 1150 may be configured to support rapid access to extensive databases of embeddings representing code segments for functional similarity analysis. The database may store feature vector representations generated from binaries, enabling similarity-based comparison without requiring prior knowledge of the binaries' behaviors. This configuration may enhance the performance of the Functional Similarity Analyzer 430 or the Supervised Classification Model 524.

The AI/ML Processing Unit 1130 may be specifically designed to accelerate the operations of the Machine Learning Classifier 434 or the Graph Neural Network 528. This specialized hardware may reduce the time required for machine learning inference tasks during vulnerability analysis.

The Client I/O Subsystem 1170 may be tailored to support the needs of security analysts. The Display Interface 1185 may be optimized for visualizing code structures or analysis results. The User Input Devices 1190 may include specialized input methods for efficiently navigating and annotating binary code during manual review processes.

In some cases, the Client Computing Architecture 1100 may support distributed computing capabilities. The Network Interface Controller 1180 may be configured to enable seamless integration with cloud-based analysis services or to participate in coordinated analysis efforts across multiple systems.

The Client Computing Architecture 1100 provides a flexible platform for implementing binary analysis and vulnerability detection systems. By leveraging the capabilities of each subsystem, the architecture enables efficient execution of analysis tasks, from initial binary extraction to final vulnerability reporting.

Server-Client Network Architecture

Figure 10:
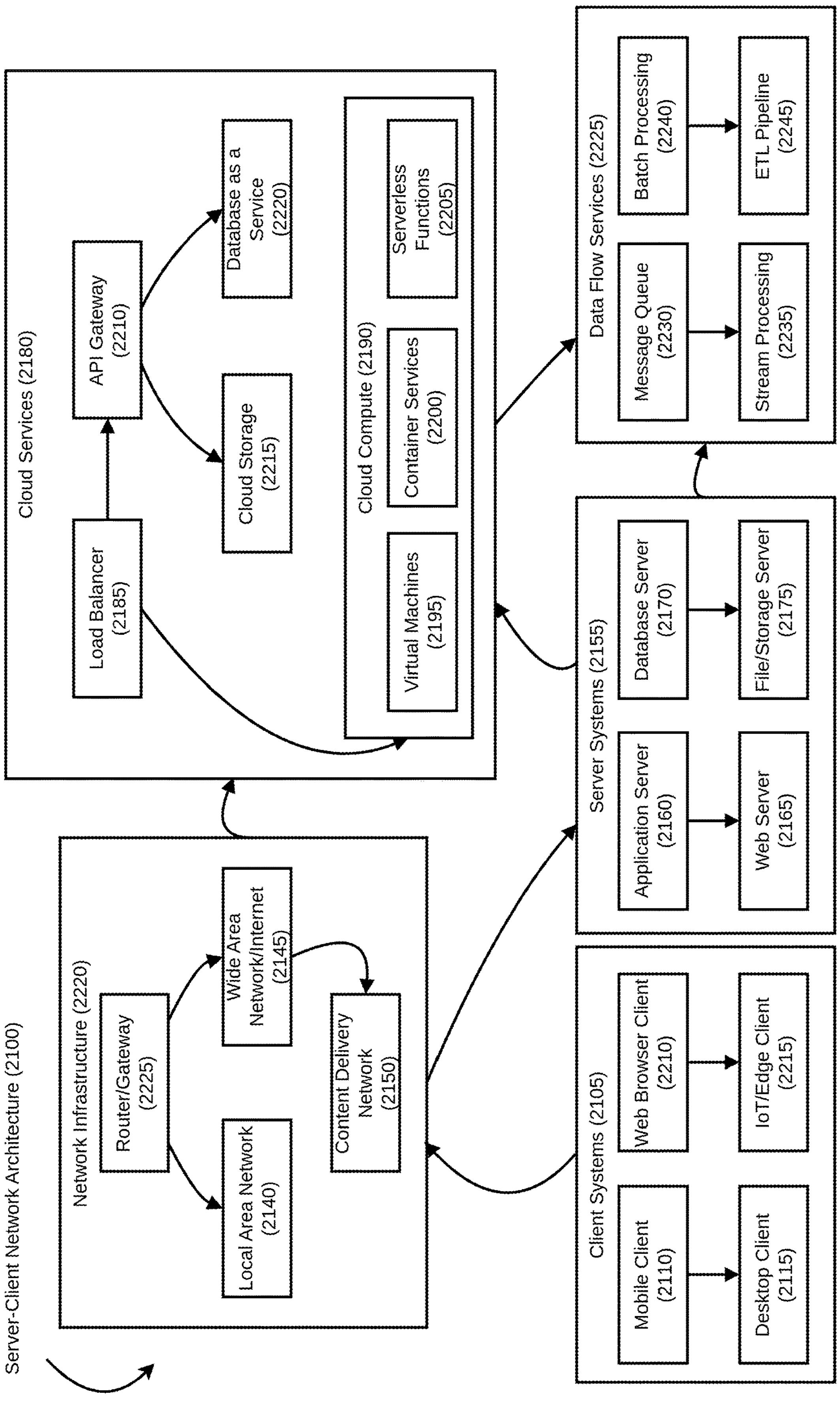
FIG. 10 shows a server-client network architecture for data communication and processing, according to aspects of the present disclosure.

FIG. 10 illustrates a Server-Client Network Architecture 1200 for data communication and processing in the context of security vulnerability detection. The Server-Client Network Architecture 1200 may facilitate distributed analysis and reporting of vulnerabilities in infrastructure components binaries.

The Server-Client Network Architecture 1200 comprises Client Systems 1205, which may include various types of devices capable of interacting with the Security Vulnerability Detection System 400 or the Machine Learning-Based Vulnerability Detection System 500. These client systems may include a Mobile Client 1210, a Desktop Client 1215, a Web Browser Client 1220, and an IoT/Edge Client 1225. Each of these client types may have different capabilities and requirements for accessing and utilizing the vulnerability detection services.

In some cases, the Mobile Client 1210 may be a smartphone or tablet device running a dedicated application for submitting binaries for analysis and receiving vulnerability reports. The Desktop Client 1215 may be a full-featured workstation used by security analysts to perform in-depth analysis and interact with the vulnerability detection systems. The Web Browser Client 1220 may provide a platform-independent interface for accessing the vulnerability detection services through standard web technologies. The IoT/Edge Client 1225 may represent embedded devices or edge computing nodes that require specialized vulnerability analysis tailored to their unique hardware and software configurations.

The Client Systems 1205 connect to the Server Systems 1255 through a Network Infrastructure 1230. This infrastructure may include a Router/Gateway 1235 that manages traffic between different network segments. A Local Area Network 1240 may provide high-speed connectivity for clients within an organization, while a Wide Area Network/Internet 1245 enables remote access to the vulnerability detection services. In some cases, a Content Delivery Network 1250 may be employed to optimize the delivery of static assets and improve the responsiveness of web-based interfaces.

The Server Systems 1255 form part of the vulnerability detection infrastructure. An Application Server 1260 may host the main logic of the Security Vulnerability Detection System 400, including components such as the Rule-Based Decompiler Framework 406 and the Symbolic Execution Engine 418. A Web Server 1265 may serve as the entry point for web-based clients, handling HTTP requests and responses. A Database Server 1270 may store vulnerability data, analysis results, and machine learning model parameters. A File/Storage Server 1275 may manage large binary files and intermediate analysis artifacts.

To handle scalability and high-performance computing requirements, the Server-Client Network Architecture 1200 may incorporate Cloud Services 1280. A Load Balancer 1285 may distribute incoming requests across multiple server instances to ensure optimal resource utilization and responsiveness. The Cloud Compute 1290 infrastructure may provide flexible computing resources, including Virtual Machines 1295 for running traditional server applications, Container Services 1300 for deploying microservices-based components, and Serverless Functions 1305 for executing specific analysis tasks on-demand.

An API Gateway 1310 may serve as a central point of entry for client requests, handling authentication, rate limiting, and request routing to appropriate backend services. Cloud Storage 1315 may provide scalable and durable storage for large datasets, such as binary repositories and historical vulnerability data. A Database as a Service 1320 may offer managed database solutions optimized for the specific requirements of vulnerability analysis workloads.

The Server-Client Network Architecture 1200 may include Data Flow Services 1325 to manage the processing and movement of data throughout the system. A Message Queue 1330 may facilitate asynchronous communication between different components of the vulnerability detection system. Stream Processing 1335 capabilities may enable real-time analysis of incoming binary data or continuous monitoring of system logs for security threats. Batch Processing 1340 may handle large-scale analysis tasks that can be performed offline or during periods of low system load. An ETL Pipeline 1345 (Extract, Transform, Load) may manage the flow of data between different storage systems and analysis components.

In some cases, the Server-Client Network Architecture 1200 may be designed to support distributed and parallel processing of binary analysis tasks. For example, the Parallel CFG Constructor 412 may leverage the Cloud Compute 1290 resources to distribute the construction of control flow graphs across multiple nodes, improving the overall performance of the analysis process.

The Machine Learning Model Applier 522 may utilize the Cloud Services 1280 to scale out the execution of machine learning models. The Supervised Classification Model 524, Anomaly Detection Model 526, and Graph Neural Network 528 may be deployed as containerized services using the Container Services 1300, allowing for efficient resource allocation and easy updates to model implementations.

The Vulnerability Validator 532 may leverage the Serverless Functions 1305 to perform on-demand validation of vulnerabilities identified by the machine learning models. This approach may allow for rapid scaling of validation resources in response to varying analysis workloads.

The Security Report Generator 534 may utilize the Data Flow Services 1325 to aggregate analysis results from various components of the vulnerability detection system. The Stream Processing 1335 capabilities may enable real-time updates to security dashboards, while the Batch Processing 1340 may handle the generation of periodic reports.

In some cases, the Server-Client Network Architecture 1200 may implement advanced security measures to protect the integrity and confidentiality of the binary analysis process. The API Gateway 1310 may enforce strong authentication and encryption protocols to ensure that only authorized clients can access the vulnerability detection services. The Network Infrastructure 1230 may incorporate intrusion detection and prevention systems to safeguard against attacks on the vulnerability detection infrastructure itself.

The Server-Client Network Architecture 1200 provides a flexible and scalable foundation for implementing binary analysis and vulnerability detection systems. By leveraging cloud services and distributed computing techniques, the architecture enables processing of large volumes of infrastructure components binaries while supporting diverse client access methods and integration with existing security workflows.

Additional System Components and Techniques

The Security Vulnerability Detection System incorporates several components and techniques to enhance its ability to detect vulnerabilities, malware and implants within infrastructure binaries. These additional capabilities complement the analysis processes and provide a multi-faceted approach to binary analysis.

In some cases, the Security Vulnerability Detection System incorporates several components and techniques to enhance its ability to detect vulnerabilities, malware and implants within infrastructure binaries. These additional capabilities complement the analysis processes and provide a multi-faceted approach to binary analysis. The system may implement an automated false-positive reduction system that utilizes machine learning algorithms to learn from analyst feedback and historical detection patterns. This automated system may employ ensemble methods combining multiple classification models to reduce false positive rates while maintaining detection sensitivity. The false-positive reduction system may incorporate active learning techniques that prioritize uncertain cases for human review, thereby improving the overall accuracy of the detection process through iterative refinement.

The Security Vulnerability Detection System may implement an automated calibration process for the Markov model-based false positive estimation module. This calibration process allows the system to adapt to changing threat landscapes and improve its detection capabilities over time. The system may optimize the Markov model-based statistical analysis module through iterative training and adjustment, helping the detection algorithms remain capable against evolving malware techniques.

The Markov model-based false positive estimation module may define a state space comprising discrete states that represent different stages of pattern matching confidence. In some cases, the state space may include states such as S_init representing the initial state before pattern evaluation, S_partial representing partial pattern matches that may be benign, S_suspicious representing matches with elevated threat indicators, S_confirmed representing high-confidence threat detections, and S_benign representing confirmed false positive classifications. Transition probabilities between states may be learned from historical detection data, where each transition $P(S_j|S_i)$ represents the probability of moving from state S_i to state S_j given observed pattern features.

The feature vector input to the Markov model may include the number of pattern elements matched, the specificity of matched elements measured by inverse document frequency across the binary corpus, the presence of known benign code signatures, the binary's origin and trust level, and contextual features such as the presence of debug symbols or known compiler signatures. The emission probabilities may model the likelihood of observing specific feature combinations in each state. The module may compute the posterior probability of the S_confirmed state given the observed evidence using forward-backward algorithms, and may flag detections as potential false positives when P(S_benign|evidence) exceeds a configurable threshold. The calibration process may employ expectation-maximization to update transition and emission probabilities based on analyst feedback on detection accuracy.

In some cases, the Security Vulnerability Detection System performs disassembly-based detection using pattern matching with a Markov model. This approach involves implementing a disassembly pattern matching with an associated pattern language integrated into a rule Domain-Specific Language (DSL). The disassembly pattern matching may be integrated into the rule DSL, enabling rule specification, pattern definition, and detection logic for firmware and drivers.

The Security Vulnerability Detection System may utilize the Markov model-based statistical analysis module to evaluate assembly patterns during pattern development. This evaluation process helps identify problematic patterns before they are deployed in production environments, further reducing the risk of false positives.

By leveraging the disassembly pattern matching in conjunction with the Markov model-based statistical analysis module, the Security Vulnerability Detection System may detect low-level or obfuscated malware that might evade traditional detection methods. This capability is particularly valuable when analyzing infrastructure components such as firmware, bootloaders, and drivers, which often contain optimized assembly code. The system may incorporate specialized persistence mechanism detection capabilities that identify techniques used by malware to maintain presence across system reboots and updates. These persistence mechanisms may include bootkit installations, firmware modifications, registry manipulations, service installations, and scheduled task creations. The persistence detection system may analyze boot sequences, interrupt handlers, and system initialization routines to identify unauthorized modifications that could indicate the presence of persistent threats. The system may maintain a database of known persistence techniques and their associated signatures, enabling identification of both known and novel persistence mechanisms.

The Security Vulnerability Detection System may facilitate the detection of assembly-level component constructs. This capability allows the system to identify malware techniques that operate at the lowest levels of the system, such as rootkits or bootkits that manipulate hardware interfaces or interrupt handlers.

In some cases, the Security Vulnerability Detection System implements a retrieval-augmented generation (RAG) system. The RAG system may provide detection capabilities by dynamically retrieving and incorporating relevant contextual information during analysis. This approach allows the system to leverage a knowledge base of known vulnerabilities, malware signatures, and security best practices when analyzing new binaries. The RAG system may employ vector databases for high-dimensional embeddings, enabling similarity searches across large collections of code snippets and vulnerability patterns. The system may utilize approximate nearest neighbor algorithms such as Hierarchical Navigable Small World (HNSW) graphs or Locality-Sensitive Hashing (LSH) to perform similarity queries. The RAG system may integrate with external threat intelligence feeds, vulnerability databases such as the National Vulnerability Database (NVD), and security research repositories to maintain current knowledge bases. The system may implement semantic search capabilities that understand the intent and context of queries, enabling more accurate retrieval of relevant information for analysis.

The Security Vulnerability Detection System may also implement a multi-agent system with goal coordination. This approach involves deploying specialized artificial intelligence agents that focus on different analysis techniques and share insights through a message-passing coordination framework. The multi-agent approach allows for more flexible and adaptive analysis strategies, as the system can dynamically allocate analytical tasks based on binary characteristics and initial findings. Specialized agents may be designed with domain-specific expertise, such as firmware analysis agents trained on bootloader patterns, driver analysis agents specialized in kernel-level code, or malware detection agents focused on specific threat families. The agents may communicate through a message-passing interface that enables real-time sharing of discoveries, hypotheses, and analytical insights. The coordination framework may implement consensus mechanisms that aggregate findings from multiple agents to produce more reliable analysis results. The system may employ reinforcement learning techniques to improve agent behavior and task allocation strategies based on historical performance and success rates.

In some cases, the multi-agent system with goal coordination enables goal-oriented analysis where the specialized artificial intelligence agents define and pursue specific analytical objectives. This capability allows the system to adapt its analysis strategy based on the unique characteristics of each binary, uncovering vulnerabilities or malicious behaviors that might be missed by more rigid analysis approaches.

The Security Vulnerability Detection System may integrate these components and techniques with dynamic analysis frameworks to automate debugging tasks. This integration allows for more analysis of binary behavior, combining static analysis techniques with runtime observations to provide a more complete picture of security threats.

By incorporating these additional components and techniques, the Security Vulnerability Detection System provides a multi-faceted approach to binary analysis and vulnerability detection. The combination of signature-based detection, disassembly-based analysis, Markov model-based statistical techniques, retrieval-augmented generation, and multi-agent approaches allows for an adaptable system capable of detecting a wide range of threats in infrastructure binaries.

Domain-Specific Language Architecture

The security vulnerability detection system may implement a Domain-Specific Language (DSL) architecture that serves as the foundation for rule definition and execution across analysis components. The DSL may be designed as a non-Turing complete language to help ensure predictable execution times and resource usage while providing sufficient expressiveness for detection rules. The DSL architecture may govern the application, prioritization, and execution of multiple analysis techniques within the unified framework.

The DSL may specify how and when different types of signatures are applied, including YARA rules for pattern matching, assembly-level patterns for low-level detection, and semantic patterns for behavior-based analysis. The language may define rule applicability conditions and execution contexts specific to infrastructure components, enabling fine-grained control over when detection rules are triggered based on binary characteristics, execution environment, and analysis context.

The DSL architecture may facilitate rapid updates and incorporation of new detection rules in response to firmware-based attacks without requiring system downtime or significant reconfiguration. The language may support rule versioning, dependency management, and conflict resolution to ensure consistent behavior across different analysis components. The DSL may also enable interoperability between decompilers, emulators, symbolic execution engines, and pattern matching components by providing a common interface for rule specification and execution.

Binary Analysis and Vulnerability Detection System

The computer-implemented method for detecting vulnerabilities, malware and implants within infrastructure binaries may comprise several interconnected processes and techniques. The method may begin with receiving an infrastructure binary or a set of infrastructure binaries associated with infrastructure components by a computing device. In some cases, the infrastructure components may comprise components executing on hardware to provide functionality for hardware components, including firmware, bootloaders, and drivers.

The computer-implemented method for detecting vulnerabilities, malware and implants within infrastructure binaries may comprise several interconnected processes and techniques. The method may begin with receiving an infrastructure binary or a set of infrastructure binaries associated with infrastructure components by a computing device. In some cases, the infrastructure components may comprise components executing on hardware to provide functionality for hardware components, including firmware, bootloaders, and drivers.

The method may involve extracting the infrastructure binary by employing extraction methodologies, including binary analysis tools, to decompose and retrieve individual executable components. This extraction process may prepare the binary for subsequent analysis stages.

Complementary Analysis Techniques

Multiple analysis techniques may be applied to the extracted binary. These techniques may include decompilation and emulation processes, offering insights into the binary's structure and behavior.

In some cases, the method may involve decompiling the extracted binary and applying a rule-based decompiler. This framework may utilize interprocedural analysis to trace function calls, variable usage, and pointer references across the infrastructure components. The framework may implement reverse engineering techniques including type recovery through forward and backward propagation, and type discovery.

The rule-based decompiler constructs control flow graphs (CFGs) through parallel processing mechanisms. These mechanisms may be configured for the structured complexity and deterministic characteristics of the infrastructure components. The framework may conduct whole-program analysis to detect cross-function behaviors indicative of vulnerabilities, malware and implants.

In addition to decompilation, the method may involve emulating the extracted binary within an emulation environment to monitor and analyze runtime behavior. This emulation process may provide valuable insights into the binary's dynamic characteristics that may not be apparent from static analysis alone.

Symbolic Execution and Vulnerability Detection

The method may include performing symbolic execution on the processed extracted binary in parallel with the decompilation and emulation processes. This symbolic execution may be particularly effective for detecting vulnerabilities and obfuscated malware that would otherwise break the decompiler.

The symbolic execution may generate symbolic inputs tailored to the operational characteristics of infrastructure components. It may explore multiple execution paths to detect vulnerabilities, including buffer overflows and unauthorized access.

In some cases, the symbolic execution may be configured with bounded execution paths, parallel CFG generation, and state management techniques suited for the infrastructure components. This configuration may enable analysis of large binaries while enhancing scalability. The process may also include validating identified vulnerabilities to ascertain exploitability within the specific context of the infrastructure components.

The bounded symbolic execution engine may implement multiple strategies to constrain the exploration space while maintaining analysis coverage. Loop bounding may limit the number of iterations explored for each loop construct to a configurable maximum, typically ranging from 2 to 10 iterations depending on binary complexity; the bound may be dynamically adjusted based on loop characteristics such as the presence of array indexing expressions that suggest buffer traversal. Path merging may combine symbolic states at control flow join points when the merged state representation remains tractable, reducing exponential path explosion to polynomial growth in many cases. State prioritization may employ a generational search strategy that alternates between depth-first exploration to reach deep program states and breadth-first expansion to help ensure coverage of early branches.

The engine may implement selective symbolic execution that concretizes values for complex operations such as floating-point arithmetic, cryptographic functions, or system calls that would otherwise produce intractable constraints. Memory models may employ lazy initialization, creating symbolic values for uninitialized memory regions only when accessed, and may use segmented representations that separate stack, heap, and global memory regions to reduce constraint complexity. Constraint caching may store and reuse satisfiability results for previously evaluated constraint sets, with cache keys computed via structural hashing of constraint expressions.

Pattern Matching and Analysis Processes

The method may run multiple pattern matching and analysis processes in parallel that operate on outputs from the decompilation, emulation, and symbolic execution. These processes may include semantic pattern matching to detect component structures based on defined semantic features, and functional similarity analysis that generates feature vector representations (embeddings) from the extracted binary and compares them against embeddings stored in a similarity database to identify similar functionality patterns and common vulnerabilities.

The functional similarity analysis may employ graph-based representations of code structure to enable comparison across different binary implementations, compiler optimizations, and architectural variations. Each function or code region may be represented as an attributed graph wherein nodes correspond to basic blocks and edges represent control flow relationships. Node attributes may capture structural and semantic properties of each basic block, including instruction class distributions, constant value usage, arithmetic operation counts, and local control flow complexity metrics.

The similarity database may be constructed by extracting features from binaries and generating embeddings (feature vector representations) for each code segment. This process operates on any binary regardless of whether its behavior is previously known, as the feature extraction and embedding generation rely on structural and semantic properties observable from the binary itself rather than requiring prior behavioral knowledge. The database stores these embeddings in an indexed structure optimized for efficient similarity search, enabling rapid identification of similar code regions when analyzing new binaries.

The similarity computation may employ graph comparison techniques that measure structural correspondence between attributed graphs. Graph kernel methods may compute similarity scores based on substructure matching, wherein the similarity between two graphs reflects the degree of overlap in their local neighborhood patterns. The comparison may be performed at multiple scales, capturing both fine-grained instruction-level patterns through small neighborhood radii and coarse-grained structural relationships through larger neighborhood radii.

To enable efficient similarity search across large code databases, the system may generate compact numerical representations of code regions through embedding techniques. These embeddings may map code structures into a vector space wherein similar code regions occupy proximate positions according to a distance metric. The embedding generation may employ neural network architectures designed to capture both sequential instruction patterns and graph-structured control flow relationships, producing fixed-dimensional vectors suitable for efficient comparison.

The comparison database may be organized as an index structure optimized for approximate nearest neighbor search in high-dimensional embedding spaces. The index may employ hierarchical partitioning techniques or locality-sensitive hashing to enable sub-linear query complexity, allowing rapid identification of similar code regions even when the database contains embeddings for millions of functions. The database may contain embeddings derived from known vulnerable code patterns, malware samples, and reference implementations of common functionality, enabling identification of code regions that exhibit similarity to known threats or established vulnerable patterns.

The similarity analysis may incorporate normalization techniques to abstract away superficial variations that do not affect functional behavior. Register allocation differences, instruction reordering within basic blocks, and equivalent instruction substitutions may be normalized prior to comparison through canonicalization of the intermediate representation. This normalization may enable detection of functionally equivalent code across different compilation settings, optimization levels, or manual obfuscation attempts that preserve program semantics while altering syntactic representation.

Additionally, the method may employ behavioral pattern matching using LSTM networks on API call sequences to analyze sequences of operations for patterns indicative of malicious behavior, including malware, backdoors, and implants. Random forest classifier trained on labeled infrastructure component datasets for anomaly detection utilizing neural networks may be used to identify anomalous component patterns and threats.

The LSTM network for behavioral pattern matching may process sequences of API calls and system interactions extracted from emulation traces. The input representation may encode each API call as a tuple comprising the API function identifier embedded as a learned vector, categorical encodings of argument types, and optional numerical features such as buffer sizes or file handle values normalized to a standard range. The LSTM architecture may comprise two stacked LSTM layers with hidden dimensions of 128 to 256 units, with dropout applied between layers to prevent overfitting. For variable-length sequences, the network may employ packed sequence representations to handle batch processing.

The final hidden state of the LSTM may be passed through a multi-layer perceptron with a softmax output layer for classification into behavioral categories including benign operation, data exfiltration, privilege escalation, persistence establishment, and lateral movement. Alternatively, for sequence-to-sequence tasks such as predicting the next expected API call for anomaly detection, the network may employ an encoder-decoder architecture with attention mechanisms that allow the decoder to focus on relevant portions of the input sequence. The training data may comprise API call sequences extracted from both malicious and benign binaries executed in controlled sandbox environments, with data augmentation techniques such as sequence truncation and API call substitution applied to improve generalization.

The random forest classifier for anomaly detection may operate on a feature vector comprising multiple categories of features extracted from the analyzed binary. Structural features may include the cyclomatic complexity of functions, the depth of nested control structures, the ratio of conditional branches to total instructions, and the number of indirect jumps or calls. Data flow features may include the distance between variable definition and use sites, the number of pointer dereferences in each function, the presence of unchecked array indexing operations, and taint propagation distances from input sources to security-sensitive sinks. Statistical features may include the entropy of instruction opcode distributions, the frequency of privileged instructions, the ratio of memory operations to arithmetic operations, and deviation metrics comparing the function's instruction distribution to corpus-wide baselines.

Semantic features derived from decompilation may include the presence of known vulnerable API call patterns such as strcpy or sprintf without bounds checking, the use of integer arithmetic preceding memory allocation, and patterns indicative of time-of-check to time-of-use vulnerabilities. The random forest may comprise between 100 and 500 decision trees with maximum depths ranging from 10 to 30 levels, trained using bootstrap aggregation with feature subsampling at each split. Feature importance scores computed via mean decrease in impurity may be used to identify the most discriminative features and to guide feature engineering refinements.

Integration and Autonomous Examination

The method may involve integrating outputs derived from the multiple analysis techniques into a unified model. This integration may enable detection of threats that would not be identifiable by any single analysis technique alone.

The unified model integration may employ a multi-source data fusion architecture that combines heterogeneous outputs from static analysis, dynamic analysis, symbolic execution, and pattern matching into a coherent threat assessment. Each analysis technique may produce findings in a standardized indicator format that captures detection confidence, evidence strength, and supporting contextual information, enabling consistent processing regardless of the originating technique.

The integration process may begin with normalization of confidence scores across different analysis techniques. Different techniques may exhibit varying baseline accuracy rates and confidence distributions, necessitating calibration to enable meaningful comparison and combination. The normalization may employ statistical techniques that map raw confidence values to calibrated probability estimates reflecting true positive rates observed during validation against labeled datasets.

The fusion architecture may employ machine learning ensemble methods to combine outputs from multiple analysis techniques. A multi-level architecture may utilize base-level classifiers corresponding to individual analysis techniques, with a meta-level classifier trained to combine base-level outputs into final predictions. The meta-level classifier may learn optimal weighting of different techniques based on their observed accuracy across different vulnerability types and binary characteristics, improving overall detection performance beyond what any single technique achieves independently.

Evidence combination may employ belief function techniques to aggregate findings from multiple sources while accounting for uncertainty and potential conflicts. Each analysis technique may contribute a mass function reflecting its assessment of threat presence, with combination rules aggregating these mass functions into a unified belief state. Conflict between techniques may be quantified and used to identify findings requiring additional validation or human review, as conflicting evidence may indicate either a complex threat requiring multiple perspectives or a potential false positive from one technique.

The integration algorithm may implement a weighted scoring framework that combines heterogeneous outputs based on validated technique accuracy. For each analysis technique t and vulnerability type v, the system may maintain an accuracy weight w(t,v) derived from historical validation data, computed as the harmonic mean of precision and recall (F1 score) observed for that technique on that vulnerability class. When a technique produces a finding, the raw output may be converted to a normalized threat indicator score s(t) in the range [0,1]: symbolic execution paths may be scored based on constraint satisfiability and path feasibility metrics, pattern matching results from YARA or regex signatures may be scored based on match completeness and specificity, and CNN classification outputs may use the softmax probability for the threat class directly. The final integrated threat score S for a candidate vulnerability may be computed as a weighted combination: $S=\Sigma(w(t,v)\times s(t)\times c(t))/\Sigma(w(t,v)\times c(t))$, where c(t) is a binary indicator of whether technique t produced a finding for the candidate, and the summations are taken over all techniques that evaluated the candidate. The accuracy weights w(t,v) may be periodically recalibrated based on analyst feedback and ground truth validation, with separate weight matrices maintained for different binary characteristics such as architecture, component type, and optimization level. This weighted integration approach may enable the system to automatically prioritize findings from techniques with demonstrated accuracy for specific vulnerability types while still incorporating corroborating evidence from less accurate but complementary techniques.

The unified model may incorporate context-aware fusion parameters that adjust technique weighting based on binary characteristics and analysis context. Different infrastructure component types may exhibit different susceptibility to various vulnerability classes, and different analysis techniques may exhibit varying effectiveness across these vulnerability classes. The fusion parameters may be adapted based on detected component type, processor architecture, operating environment, and other contextual factors to optimize detection accuracy for the specific binary under analysis.

The system analyzes the integrated outputs to detect malware and implants, and vulnerabilities in the extracted binary. This examination may leverage the inherent similarity and predictability of infrastructure components and devices, and correlate findings across the multiple analysis techniques to reduce false positives and enhance detection accuracy.

The threat examination may employ cross-technique correlation to validate findings and reduce false positive rates. Findings from different analysis techniques that reference the same code location or exhibit causal relationships may be linked into evidence chains that strengthen or weaken overall threat assessment. The correlation process may construct an evidence graph wherein nodes represent individual findings and edges represent corroborating or contradicting relationships between findings.

The examination process may implement staged validation wherein findings progress through increasingly rigorous confirmation steps. Initial findings from lightweight analysis techniques may be subjected to validation by more computationally intensive techniques, with resource allocation prioritized toward high-severity candidates. Static analysis findings may be validated through dynamic confirmation, wherein the emulation environment is configured to exercise the code path containing the potential vulnerability to observe whether the vulnerable behavior manifests at runtime. Symbolic execution may validate reachability of vulnerable code paths by solving path constraints from program entry points to the vulnerable location.

Confidence scoring may incorporate multiple factors including technique reliability, evidence corroboration, and temporal relevance. Findings corroborated by multiple independent techniques may receive elevated confidence scores, while findings contradicted by other techniques may receive reduced scores. The scoring algorithm may account for the varying reliability of different techniques across different vulnerability types, applying technique-specific weights during score computation to reflect observed precision and recall characteristics.

Alert consolidation may group related findings to present a coherent threat assessment rather than overwhelming analysts with redundant notifications. Multiple findings stemming from a common root cause may be clustered and presented as a single consolidated alert with associated supporting evidence from each contributing technique. The consolidation may employ program dependence analysis to identify causal relationships between findings at different code locations, recognizing when a vulnerability at one location enables or exacerbates a vulnerability at another location. Priority assignment may consider both individual finding severity and the aggregate impact of related findings.

The examination may implement automated triage to distinguish between confirmed vulnerabilities, likely false positives, and findings requiring manual review. Triage rules may be expressed in the domain-specific language, enabling rapid adaptation to evolving threat patterns and organizational risk tolerance without requiring system modification. Findings that satisfy predefined confirmation criteria may be automatically escalated for remediation, while findings exhibiting characteristics associated with false positives based on historical analysis may be deprioritized or filtered from primary reporting.

Reporting and Communication

The method culminates in generating a security report detailing detected issues, severity ratings, and contextual data derived from the examination. This report includes information about which combination of the multiple analysis techniques contributed to detections.

The severity rating process may employ automated assessment of vulnerability characteristics to generate standardized severity scores compatible with established vulnerability scoring frameworks. The assessment may infer metric values based on vulnerability type, affected code context, and potential impact scope. Attack vector assessment may consider whether exploitation requires network access, local access, or physical presence based on analysis of the code path leading to the vulnerability and the interfaces through which attacker-controlled input may reach the vulnerable code.

Attack complexity assessment may consider whether exploitation requires specialized conditions such as winning race conditions, bypassing exploit mitigations, or obtaining specific system configurations, or whether exploitation can be achieved through straightforward interaction with the vulnerable interface. The assessment may analyze control flow constraints, timing dependencies, and prerequisite conditions identified during symbolic execution to determine the complexity of constructing a successful exploit.

The severity computation may incorporate infrastructure-specific factors that reflect the elevated risk associated with vulnerabilities in firmware, bootloaders, and drivers. Vulnerabilities affecting early boot stages, such as platform initialization or pre-boot authentication, may receive elevated severity due to their potential to compromise platform integrity before operating system security controls are established. Vulnerabilities enabling escalation to privileged execution modes, such as system management mode or hypervisor context, may receive elevated severity due to the expanded attack surface and persistence capabilities available at elevated privilege levels.

Exploitability assessment may consider factors including the availability of attacker-controlled inputs reaching the vulnerable code path, the presence of exploit mitigations that must be bypassed, and the predictability of memory layout or other exploitation prerequisites. The assessment may incorporate findings from symbolic execution regarding the satisfiability of exploitation constraints and findings from dynamic analysis regarding the reliability and reproducibility of exploitation attempts. Vulnerabilities for which the system can automatically generate triggering inputs may receive elevated exploitability ratings.

The severity rating may incorporate contextual adjustment factors based on the deployment context and asset criticality when such information is available. Infrastructure components deployed in internet-facing systems, critical infrastructure, or high-value environments may receive elevated priority relative to components deployed in isolated or non-critical contexts. The adjustment factors may be configurable to reflect organizational risk tolerance, regulatory requirements, and asset inventory information provided by the operator.

The security report may include detailed contextual information enabling informed remediation decisions. For each detected issue, the report may include the specific code location with function name and offset, a description of the vulnerability type and potential impact, the analysis techniques that contributed to detection with their respective confidence levels, and recommended remediation actions where determinable. The report may include cross-references to related vulnerabilities detected in the same binary, applicable common weakness enumerations, and relevant security advisories from vulnerability databases where matches are identified.

The security report may be transmitted to a remote security monitoring system or displayed on a user interface of the computing device, so that the results of the analysis may be communicated to relevant stakeholders.

Advanced Detection Techniques

The method may incorporate several detection techniques to provide capabilities. In some cases, the method may implement signature-based detection with integrated false positive control. This may involve incorporating a dedicated domain-specific language (DSL) that coordinates detection rule execution within the analytical framework. The DSL may govern the application, prioritization, and execution of all detection types, including rule-based signatures, and provide a structured framework for defining rule applicability, execution conditions, and context-specific analysis parameters.

A Markov model-based false positive estimation module may be implemented to predict false positive probabilities independent of any detection. This module may be configured to dynamically evaluate patterns against probabilistic models and apply statistical inference to filter patterns that fall below a predefined probability threshold.

The method may include an automated calibration process for the Markov model-based false positive estimation module. In this process, probabilistic thresholds may be optimized based on observed data patterns, thereby enhancing detection precision and reducing erroneous alerts.

The method may enable streamlined and expedited updates to detection types through the DSL, including rule-based signatures, symbolic execution patterns, decompiler output patterns, and other analytical techniques. This capability may facilitate the rapid deployment of new detection capabilities in response to firmware-based attacks without necessitating system downtime or significant reconfiguration.

Disassembly-Based Detection

In some cases, the method may perform disassembly-based detection using pattern matching with a Markov model. This approach may involve implementing a disassembly pattern matching with an associated pattern language designed for the identification of assembly-level component constructs. The disassembly pattern matching may be integrated into a rule DSL, enabling rule specification, pattern definition, and detection logic for firmware and drivers.

The method may utilize a Markov model-based statistical analysis module to evaluate assembly patterns during pattern development rather than at detection time. This module may be trained to recognize benign instruction sequences and differentiate them from suspicious or malicious patterns, thereby preventing patterns that would generate false positives from being deployed.

By leveraging the disassembly pattern matching in conjunction with the Markov model-based statistical analysis module, the method may detect low-level or obfuscated malware, particularly in firmware binaries where assembly instructions may lack higher-level semantic references.

The method may facilitate detection of assembly-level component constructs, including suspicious shellcode fragments and other malicious artifacts, through a combination of rule-based pattern matching and statistical inference. The Markov model-based statistical analysis module may be continuously optimized through iterative training and adjustment based on detected patterns, thereby providing adaptive detection capabilities as new threats emerge.

Whole Program Analysis

The method may involve performing whole program analysis by constructing a program dependence graph that combines control and data dependencies across the extracted binary. This process may include integrating control flow information derived from disassembly tools with extended functionality and emulation frameworks with custom extensions, thereby mapping execution paths and runtime interactions within the extracted binary.

The method may incorporate data dependency information extracted using a decompiler and a function signatures scanner, thereby tracing variable usage, pointer references, and data flows across functions. The control and data dependencies may be synthesized into a unified graph that models the extracted executable binary's behavior, thereby capturing interactions between firmware components and driver routines.

In some cases, the method may apply graph neural networks to analyze the program dependence graph, enabling the identification of patterns and relationships that may indicate vulnerabilities or malicious components.

The graph neural network architecture for program dependence graph analysis may employ a message-passing framework with multiple propagation layers. Each node in the program dependence graph may be initialized with a feature vector comprising the node type encoding indicating whether the node represents an instruction, basic block, or data element, the instruction opcode embedding for instruction nodes, data type information for data nodes, and positional encodings based on topological sort order. Edge features may encode the dependency type distinguishing control dependencies, data flow dependencies, and call graph edges, along with optional edge attributes such as data size for data flow edges or branch condition polarity for control edges.

The network may employ a gated graph neural network architecture where each propagation step computes messages from neighboring nodes, aggregates incoming messages using attention-weighted summation, and updates node representations through a gated recurrent unit. After K propagation steps, typically ranging from 4 to 8, the network may apply a graph-level readout function combining mean pooling and max pooling of node representations to produce a fixed-dimensional graph embedding. For vulnerability detection tasks, the graph embedding may be passed through fully connected layers with dropout regularization to produce classification outputs. For localization tasks, node-level representations after propagation may be used to predict per-node vulnerability scores. The network may be trained end-to-end using labeled program dependence graphs extracted from binaries with known vulnerabilities.

The method may apply abstract interpretation techniques with custom abstract domains adapted to common firmware and driver data types. This may involve utilizing a semantic pattern matching enhanced with a large language model to abstract high-level components behaviors and identify semantic constructs. Custom abstract domains may be defined for hardware register values, memory-mapped I/O operations, and device-specific data structures, thereby modeling their interactions with control flow and data operations.

Decompilation-Based Detection

The method may perform decompilation-based detection by introducing a decompiler designed to utilize platform-specific rules corresponding to various environments, including Windows kernel, Linux user-space, and Unified Extensible Firmware Interface (UEFI). The decompiler may provide specialized guidance for symbol naming, type propagation hints, and structural interpretation of the extracted binary.

A de-optimizer module may be implemented within the decompiler. This module may be designed to reverse compiler optimizations such as loop constructs, thereby enabling the recovery of high-level components patterns otherwise obscured by optimization techniques.

The method may provide a compiler that translates the platform-specific rules into executable decompilation components, thereby facilitating rapid deployment of decompilation strategies tailored to specific architectures and platforms. A runtime engine may be incorporated to perform analysis including forward and backward type propagation, taint analysis, type recovery, type discovery, and backtracking-based inference. This runtime engine may refine its analysis by iteratively resolving ambiguous or component patterns.

The method may generate a refined intermediate representation of the extracted binary, optimized for compatibility with subsequent analysis stages, including syntactic matching, semantic detection, and behavioral pattern matching. This process may provide accuracy and efficiency of the analytical process by producing clearer, rule-based representations of components that improve downstream detection capabilities and facilitate the identification of previously obscured vulnerabilities or threats.

Advanced Reverse Engineering System

The rule-based decompiler includes a reverse engineering system that applies convolutional neural networks trained on disassembled firmware datasets for binary classification to identify and reconstruct high-level control structures specific to the infrastructure components, such as state machines in device drivers. This system may integrate a semantic pattern matching, which leverages a BERT-based language model fine-tuned on decompiled firmware and driver code to analyze decompiled outputs and detect specific markers and indicators, such as state transitions and control flow logic, commonly found in firmware and driver binaries.

The reverse engineering system may employ a functional similarity engine that generates feature vector representations (embeddings) for identified control structures and compares these embeddings against a database of stored embeddings representing known functional patterns, thereby providing precision of state machine reconstruction through similarity-based machine learning techniques. It may utilize convolutional neural networks trained on diverse infrastructure component datasets for pattern recognition to recognize patterns and architectural elements specific to firmware, drivers, and bootloaders.

In some cases, the system may utilize a domain-specific language for defining and applying component transformation rules for firmware decompilation. This language may incorporate C patterns and assembly patterns to create a specialized language tailored to low-level C and assembly component structures, thereby facilitating transformation rules for infrastructure binaries.

C-Based Syntax Pattern Matching

The method may perform C-based syntax pattern matching by utilizing a decompiled C representation generated by a decompiler to enable syntactic and semantic pattern analysis at the C source level. A parametric interprocedural analysis layer may be attached to the decompiled C representation, configured to statically resolve indirect function calls, function pointer references, and modular control-flow structures across multiple functions and compilation units. This layer may utilize parameters to bound analysis scope, enabling feasible execution within time and memory constraints.

The method may allow a rule DSL to specify control-flow and data-flow constraints within a C-level intermediate representation, enabling detection of nuanced malware techniques and subtle bug patterns that are not readily detectable via signature-based or surface-level syntactic checks. This approach may enable automated identification of vulnerability classes, including function pointer hijacking, control-flow manipulation, and components-reuse strategies, through the parametric interprocedural analysis layer's precise interprocedural tracking mechanisms. The method may utilize a BERT-based language model to detect specific markers and indicators in the decompiled code representation.

The method may integrate C-based syntactic pattern matching with interprocedural control-flow analysis through programmatic autonomous processing, thereby eliminating manual components auditing and enabling fully automated threat detection cycles in embedded and low-level software domains.

Semantic Pattern Matching

The method may use semantic pattern matching that leverages e-graph-based representations and static single assignment (SSA) form to detect semantically equivalent component patterns, regardless of syntactic structure or compiler-induced transformations. An output of a decompiler and an interprocedural analysis layer may be transformed into a normalized SSA-based intermediate representation through an internal transformation pipeline, facilitating canonicalization of control-flow and data-flow constructs.

E-graph rewriting techniques may be applied to the normalized SSA-based intermediate representation to construct equivalence classes of program expressions, enabling identification of vulnerabilities or malicious artifacts abstracted from register naming, instruction ordering, or compiler-specific optimization. This approach may facilitate analysis across different programming languages including C, C++, and others that can be transformed into the SSA-based intermediate representations.

The e-graph data structure may be implemented as a union-find structure augmented with hash-consing to represent and manipulate equivalence classes of program expressions. Each e-node in the e-graph may represent an operation such as addition, multiplication, memory load, or function call, with edges connecting to child e-classes representing operands. The e-graph construction process may begin by converting each SSA instruction into an initial e-node and e-class. Rewrite rules may then be iteratively applied to discover semantic equivalences; for example, a commutativity rule may merge e-classes containing (a+b) and (b+a), while an associativity rule may establish equivalence between ((a+b)+c) and (a+(b+c)).

Domain-specific rewrite rules for firmware analysis may include equivalences between different memory access patterns such as (*(base+offset)) and array indexing notation, equivalences between loop idioms and their unrolled forms, and equivalences between inline assembly sequences and their high-level semantic equivalents. The e-graph may employ a rebuilding phase after saturation to restore the congruence invariant, so that if two e-nodes have equivalent children, they are placed in the same e-class. Pattern matching against the e-graph may utilize e-matching algorithms that find instances of a pattern within any equivalence class, returning matches that may span multiple syntactically different but semantically equivalent code representations.

The method may enable a rule DSL to define semantic patterns in terms of e-graph constructs, providing a high-level interface for expressing rule logic grounded in formal semantics rather than surface syntax. This may automate semantic equivalence analysis to detect recurring vulnerability or malware patterns across diverse binaries compiled for different architectures or optimization levels, enhancing detection capabilities across multi-language firmware ecosystems and compiler toolchains, particularly where low-level transformations or obfuscation techniques would impede traditional syntactic analysis.

Machine Learning-Based Functionality Classifier

The method may implement a functionality classifier that categorizes binary components based on their functional characteristics using convolutional neural networks trained on diverse firmware and driver datasets from embedded Linux distributions, UEFI implementations, and Windows driver frameworks for multi-class classification. This classifier may identify an operational purpose of proprietary or opaque binaries by analyzing imported and exported functions, symbols, and protocol implementations.

The functionality classifier may specialize subsequent detection rules based on the identified operational purpose, focusing analysis on detecting malicious code that provides unauthorized functionality inconsistent with the determined component type. It may detect functionality mismatches that may indicate tampering, unauthorized modifications, or the presence of rootkit-style infiltrations in firmware ecosystems.

Retrieval-Augmented Generation (RAG) System

In some cases, the method may implement a retrieval-augmented generation (RAG) system that constructs a searchable knowledge base containing component snippets, vulnerability reports, malware signatures, API documentation, and hardware specifications relevant to the infrastructure binaries. The RAG system may generate component embeddings for functions and basic blocks using specialized embedding techniques designed for assembly components and intermediate representations. The knowledge base may store these embeddings as feature vectors, enabling similarity-based retrieval that operates on any binary regardless of whether its behavior is previously known.

The RAG system may perform similarity searches using approximate nearest neighbor algorithms to identify related component patterns in the searchable knowledge base. It may provide detection capabilities by dynamically retrieving and incorporating relevant contextual information during analysis, thereby improving the system's ability to identify vulnerabilities and malicious component patterns.

The approximate nearest neighbor search for the retrieval-augmented generation system may employ a hierarchical navigable small world (HNSW) graph index structure optimized for high-dimensional embedding spaces. The HNSW index may be constructed by inserting each code embedding into a multi-layer graph structure where the bottom layer contains all embeddings and higher layers contain exponentially decreasing subsets of elements, with edges connecting each element to its nearest neighbors at each layer. Search operations may begin at the highest layer and greedily traverse toward the query point, descending to lower layers as local optima are reached, achieving logarithmic search complexity in the corpus size. The index may be configured with parameters including M, the maximum number of edges per node ranging from 16 to 64, and efConstruction, controlling the size of the dynamic candidate list during construction, typically set between 100 and 500 for high-recall applications. For code similarity queries, the system may compute cosine similarity between the query embedding and candidate embeddings, returning the top-k results exceeding a configurable similarity threshold. The embedding space may be periodically reindexed as new code snippets, vulnerability reports, and malware signatures are added to the knowledge base, with index updates performed incrementally when possible to avoid full reconstruction overhead. The database construction process extracts features from binaries and generates embeddings without requiring prior knowledge of the binaries' behaviors, enabling the system to incorporate proprietary or opaque binaries into the similarity database.

The method may implement an automated false-positive reduction system that automatically attempts to confirm or refute vulnerabilities by compiling and executing suspected vulnerable functions with instrumentation in a controlled environment. This system may employ a BERT-based language model to generate mocks and stubs, converting isolated functions into self-contained test harnesses.

The false-positive reduction system may use symbolic execution with program dependency graph analysis to reduce execution scope and produce diverse test inputs aimed at triggering crashes or undefined behavior, thereby validating the exploitability of detected vulnerabilities. It may prioritize vulnerabilities based on confirmed exploitability, enabling security teams to focus resources on addressing issues with higher priority first.

Bioinformatics-Inspired Vulnerability Detection System

The method may implement a bioinformatics-inspired vulnerability detection system that applies a data encoding modulation method to convert assembly mnemonics to a biological alphabet, thereby creating mappings that enable multiple sequence alignment techniques for identifying vulnerabilities without relying on specific version signatures. This system may utilize phylogenetic algorithms to cluster binaries into related "clades," enabling comparison of related binaries and calculating a signal-to-noise ratio to exclude unrelated components paths, thereby improving the accuracy of the method.

The bioinformatics-inspired system may perform consensus-based alignments of vulnerable versus fixed components to pinpoint relevant differences. It may enable detection of vulnerabilities in firmware ecosystems where versioning is inconsistent or absent, helping vulnerabilities to be recognized even when official patch identifiers are missing.

Agentic Approach to Binary Analysis

The method may implement a multi-agent system with goal coordination that deploys specialized artificial intelligence agents that focus on different analysis techniques and share insights through a message-passing coordination framework. This approach may dynamically allocate analytical tasks based on binary characteristics and initial findings.

The message-passing coordination framework may implement an asynchronous publish-subscribe architecture where agents communicate through typed message channels. Message types may include discovery messages announcing newly identified code regions or functions of interest, hypothesis messages proposing potential vulnerabilities or malicious behaviors with associated confidence scores, evidence messages providing supporting data for or against hypotheses, and coordination messages requesting analysis assistance or reporting task completion. Each agent may maintain a priority queue of incoming messages filtered by relevance to its specialization; for example, a symbolic execution agent may subscribe to discovery messages tagged with potential vulnerability indicators while ignoring messages related to code style analysis.

The framework may implement a shared blackboard data structure where agents post intermediate findings accessible to all participants, enabling incremental refinement of analysis results. Conflict resolution mechanisms may handle contradictory findings from different agents; for example, when a static analysis agent reports a potential null pointer dereference but a dynamic analysis agent observes the pointer contains valid addresses during emulation, a mediator component may assign weights based on analysis precision characteristics and produce a reconciled assessment. The coordination framework may track agent utilization and dynamically spawn additional instances of bottleneck agents or terminate idle agents to improve resource usage. Message delivery may be supported through persistent message queues with acknowledgment protocols, helping to ensure that agent failures do not result in lost analysis results.

The multi-agent system with goal coordination may enable goal-oriented analysis where the specialized artificial intelligence agents define and pursue specific analytical objectives based on predefined security criteria. It may integrate with dynamic analysis frameworks to automate debugging tasks, including breakpoint management, state inspection, and execution flow control.

Persistence Mechanism Detection System

The method may implement a persistence mechanism detection system that analyzes the infrastructure components for techniques used by malware to maintain presence across system reboots. This system may identify modifications to system startup components, including but not limited to cron jobs and scheduled tasks, systemd services and init scripts, kernel modules and rootkits, and modified system binaries and libraries.

The persistence mechanism detection system may detect hooking mechanisms, including ELF section modifications, interrupt vector table hooking, and API and system call interception. It may employ random forest models trained on known persistence techniques for classification to identify novel or obfuscated persistence mechanisms.

Emulation-Based Analysis System

The method may implement an emulation-based analysis system that utilizes emulation frameworks to simulate execution environments for various infrastructure components types, including UEFI firmware, device drivers, and bootloaders. This system may implement a domain-specific language for rule-based dynamic analysis that orchestrates emulator operations to observe runtime behaviors, memory interactions, and exploit paths.

The emulation-based analysis system may conduct targeted fuzzing by generating inputs designed to trigger vulnerabilities in high-risk components areas. It may capture and analyze environment-dependent vulnerabilities, such as protocol logic flaws and hardware register interaction issues, that may be missed by static analysis techniques.

The emulation environment may be configured to simulate execution contexts appropriate to the infrastructure component type, including hardware abstraction layers, memory-mapped peripheral interfaces, and platform-specific runtime services. The emulation framework may employ dynamic binary translation to execute guest instructions on the host processor while maintaining full visibility into execution state, enabling observation of runtime behavior without requiring physical hardware.

For firmware and bootloader analysis, the emulation environment may simulate the early platform initialization context, including processor reset state, memory controller initialization sequences, and hardware discovery mechanisms. The environment may provide emulated interfaces for platform-specific hardware components, including flash memory controllers, trusted platform modules, serial peripheral interfaces, and interrupt controllers. Memory-mapped input/output regions may be intercepted through address translation mechanisms, with access operations routed to callback handlers that simulate peripheral behavior or record access patterns for analysis.

The emulation environment may implement instrumentation capabilities at multiple granularities to support different analysis objectives. Instruction-level instrumentation may record execution traces, register state changes, and memory access patterns for each executed instruction, enabling fine-grained analysis of code behavior. Block-level instrumentation may capture control flow transitions between basic blocks, enabling construction of dynamic control flow graphs that reflect actual execution paths. System-level instrumentation may monitor interactions with emulated hardware interfaces, system management mode transitions, and privilege level changes.

For device driver analysis, the emulation environment may simulate operating system kernel interfaces, including system call handling, interrupt dispatch, and kernel object management. The environment may provide emulated driver framework interfaces appropriate to the target operating system, enabling observation of driver initialization sequences, device communication patterns, and request processing behavior. Input/output request packet structures may be emulated to allow analysis of driver responses to various control codes and data buffers.

Runtime behavior monitoring may capture memory access patterns to identify potential buffer overflows, use-after-free conditions, and out-of-bounds access. The monitoring system may track data flow from input sources through processing operations to output destinations, enabling identification of improper input validation or sanitization. System call sequences and hardware interface interactions may be recorded and analyzed for patterns indicative of malicious behavior or security policy violations, including unauthorized memory access, privilege escalation attempts, and covert communication channels.

Machine Learning-Based Vulnerability Detection

The method may incorporate machine learning techniques for detecting security vulnerabilities in infrastructure binaries. This approach may involve extracting features from the binary, including opcode sequences and instruction patterns, control flow graph structures, API call sequences and patterns, and data flow characteristics.

Embeddings may be generated for binary components using specialized embedding techniques designed for binary components. These may include instruction-level embeddings that capture semantic relationships between machine instructions, function and basic block embeddings that represent higher-level behaviors, and graph embeddings that capture structural information from control flow graphs.

Machine learning models may be applied to the generated embeddings. These models may include supervised classification models trained on labeled datasets of vulnerable and secure components, anomaly detection models that identify unusual component patterns, and graph neural networks that analyze relationships within component structures.

The method identifies vulnerabilities based on outputs from the machine learning models and validates the identified vulnerabilities through targeted symbolic execution or emulation. A security report detailing the validated vulnerabilities and their severity is generated and transmitted to a remote security monitoring system or displayed on a user interface of the computing device.

The machine learning models may be trained using a dataset comprising firmware samples from diverse embedded systems, including commercial and open-source platforms, binaries compiled for different architectures, including ARM, MIPS, PowerPC, and x86, labeled examples of known vulnerabilities, malware, and secure components, and domain-specific features related to hardware registers, interrupt handlers, and real-time operating system constructs.

Explicit Domain-Specific Language (DSL) Architecture

The rule-based may utilize an Explicit Domain-Specific Language (DSL) Architecture. This architecture may involve implementing a non-Turing complete DSL for defining and deploying detection rules without system reinstallation. The non-Turing complete DSL may be integrated into a analytical framework to govern application, prioritization, and execution of the multiple analysis techniques.

The DSL may specify how and when different types of signatures, including YARA and assembly-level patterns, are applied. It may be utilized to define rule applicability, execution conditions, and context-specific analysis parameters for the infrastructure components. The DSL may aggregate and manage multiple rule types, including decompiler outputs, disassembly instructions, and pattern-matching criteria.

The Explicit Domain-Specific Language Architecture may enable rapid updates and incorporation of new detection rules in response to emerging threats. It may support interoperability between a decompiler, an emulator, a symbolic execution engine, and pattern matching components of the method.

By incorporating these techniques and components, the method provides an approach to detecting vulnerabilities, malware and implants within infrastructure binaries. The multi-faceted nature of the analysis, combining static and dynamic techniques, machine learning, and specialized detection systems, allows for adaptable vulnerability detection across a wide range of infrastructure components.

Advanced Pattern Recognition Systems

The security vulnerability detection system may implement multiple specialized pattern recognition systems that operate on different levels of code abstraction. The system may include SAME (Semantic Analysis Meta Engine) rules that utilize semantic analysis techniques to identify malware patterns at a deeper level than traditional syntactic methods. SAME rules may convert code into Static Single Assignment (SSA) form and utilize e-graphs (equivalence graphs) to match patterns based on underlying semantics rather than specific syntax.

The system may incorporate JASM (Just Another Syntax Matcher) components that use disassembly patterns to detect malware when decompilation is not possible or practical. JASM may identify patterns directly in assembly code, making it effective for heavily obfuscated binaries or when source-level analysis is insufficient. The system may also implement Weggli+IPA (Interprocedural Analysis) combinations that match code patterns across function boundaries, considering how different parts of the code interact.

The pattern recognition framework may include RuDA (Rule-based Driver Analysis) modules specifically designed for analyzing driver behavior and detecting anomalous patterns in kernel-level code. The system may implement DANGR (Dynamic Analysis for Next-Generation Reverse engineering) matchers that combine symbolic execution with pattern matching to identify vulnerability patterns across multiple execution paths. These specialized pattern recognition systems may work in coordination to provide coverage of different threat types and code structures.

FIG. 9 illustrates an exemplary client computing architecture 1100 on which the security vulnerability detection system, or portions thereof, may be implemented. FIG. 10 illustrates an exemplary server-client network architecture 2100 depicting deployment configurations in which the security vulnerability detection system may operate. The components shown in FIG. 9 and FIG. 10 are illustrative and do not limit the claims to any particular hardware configuration, network topology, or deployment model. The security vulnerability detection system may be implemented on any subset of the depicted components, on alternative components serving equivalent functions, or on configurations combining elements from both figures.

Referring to FIG. 9, the client computing architecture 1100 includes a processing subsystem 1105, a memory subsystem 1135, a storage subsystem 1150, a client I/O subsystem 1170, and a system bus 1195 interconnecting these subsystems.

The processing subsystem 1105 includes a central processing unit (CPU) 1110 that may execute the instructions implementing the security vulnerability detection system, including the decompilation process, the symbolic execution engine, the pattern matching processes, and the integration of outputs from multiple analysis techniques. The CPU 1110 may execute these analysis processes sequentially, in parallel across multiple cores, or in any combination thereof. The processing subsystem 1105 further includes a memory management unit 1115 that manages address translation and memory protection for the analysis processes. In some embodiments, the memory management unit 1115 facilitates the isolation of emulation environments from the host system by managing separate address spaces for emulated infrastructure binaries, thereby preventing analyzed code from affecting the host operating environment.

Cache memory 1120 within the processing subsystem 1105 may store frequently accessed portions of infrastructure binaries, intermediate representations generated during decompilation, and working data for the symbolic execution engine, thereby reducing latency during computationally intensive analysis operations. The processing subsystem 1105 further includes a graphics processing unit (GPU) 1125 that may accelerate parallelizable computation tasks within the security vulnerability detection system. In some embodiments, the GPU 1125 accelerates the training and inference of machine learning models, including the convolutional neural networks used for type recovery and discovery, the graph neural networks used for program dependence graph analysis, and the generation of embeddings for code segments. The GPU 1125 may also accelerate pattern matching operations that benefit from parallel evaluation of multiple patterns against binary data.

The processing subsystem 1105 further includes an AI/ML processing unit 1130 that may be a dedicated hardware accelerator (such as a neural processing unit or tensor processing unit) configured to execute machine learning inference operations. In some embodiments, the AI/ML processing unit 1130 performs inference for the supervised classification models, the anomaly detection models, and the transformer-based language models used in semantic pattern matching, while the CPU 1110 executes the decompilation, emulation, and symbolic execution processes. The AI/ML processing unit 1130 may also accelerate the embedding generation process and the similarity search operations used in the retrieval-augmented generation (RAG) system. In other embodiments, machine learning inference is performed on the CPU 1110 or the GPU 1125 rather than on a dedicated AI/ML processing unit 1130, and the claims are not limited to any particular allocation of computational tasks across processing elements.

The memory subsystem 1135 includes system memory (RAM) 1140 and non-volatile memory 1145. System memory 1140 may store the instructions of the security vulnerability detection system during execution, the infrastructure binaries under analysis, intermediate representations generated by the decompilation process, symbolic state information maintained by the symbolic execution engine, emulation environment state, machine learning model parameters, generated embeddings, and the integrated analysis outputs from which the security report is generated. In some embodiments, the system memory 1140 stores the knowledge base used by the retrieval-augmented generation system, including component embeddings, vulnerability reports, and malware signatures, for rapid retrieval during analysis. Non-volatile memory 1145 may store persistent components of the security vulnerability detection system, including trained machine learning model weights, the domain-specific language rule sets, signature databases, and cached analysis results. In some embodiments, non-volatile memory 1145 stores firmware images or other infrastructure binaries received for analysis prior to their loading into system memory 1140 for processing.

The storage subsystem 1150 includes a storage controller 1155 managing access to solid state storage 1160 and hard disk storage 1165. The storage subsystem 1150 may persistently store the corpus of infrastructure binaries received for analysis, training datasets used for machine learning model development, historical analysis results, the searchable knowledge base, vulnerability databases, and generated security reports. Solid state storage 1160 may be used for storage of frequently accessed data such as active rule sets, model parameters, and the similarity search index, where low-latency access improves analysis throughput. Hard disk storage 1165 may be used for archival storage of large binary corpora, historical security reports, and training data. The storage controller 1155 manages data placement across the storage media and may implement caching, wear leveling, and data integrity mechanisms. In some embodiments, the infrastructure binaries themselves are subjects of security analysis because they include firmware for storage controllers functionally similar to storage controller 1155, and the security vulnerability detection system may analyze such firmware to detect vulnerabilities in storage subsystem components.

The client I/O subsystem 1170 includes an I/O controller 1175 managing communication with peripheral devices. The I/O subsystem 1170 includes a network interface controller 1180, a display interface 1185, and user input devices 1190. The network interface controller 1180 enables the security vulnerability detection system to receive infrastructure binaries from remote sources (such as firmware repositories, device management systems, or build pipelines), to transmit security reports to remote security monitoring systems, to access remote databases or threat intelligence feeds, and to communicate with server-side analysis components in distributed deployment configurations. In some embodiments, the network interface controller 1180 is itself a component whose firmware constitutes an infrastructure binary subject to analysis by the security vulnerability detection system.

The display interface 1185 enables the security vulnerability detection system to present security reports, analysis progress, and interactive analysis interfaces to a user through a connected display device. The display interface 1185 may render the graphical user interface through which an operator reviews detected vulnerabilities, examines severity ratings, inspects contextual data, and navigates analysis results. User input devices 1190 (such as keyboards, pointing devices, or touchscreens) enable an operator to configure analysis parameters, initiate analysis workflows, author or modify domain-specific language rules, select infrastructure binaries for analysis, and interact with the security report. In some embodiments, the display interface 1185 and user input devices 1190 are implemented through a remote desktop or web-based interface rather than through locally connected peripherals.

The system bus 1195 provides the communication fabric interconnecting the processing subsystem 1105, the memory subsystem 1135, the storage subsystem 1150, and the client I/O subsystem 1170. The system bus 1195 enables the transfer of infrastructure binary data from storage to memory, the transfer of analysis results between processing elements, and the communication of security reports to the display interface 1185 or the network interface controller 1180 for transmission. The system bus 1195 may implement any bus architecture or interconnect topology, including shared bus, point-to-point, crossbar, ring, or mesh topologies.

Referring to FIG. 10, the server-client network architecture 2100 illustrates a distributed deployment configuration in which the security vulnerability detection system, or components thereof, may be distributed across client systems 2105, server systems 2155, cloud services 2180, and data flow services 2225, interconnected by network infrastructure 2220.

Client systems 2105 may include mobile clients 2110, desktop clients 2115, web browser clients 2210, and IoT/edge clients 2215. In some embodiments, a desktop client 2115 or mobile client 2110 executes the security vulnerability detection system locally, implementing all analysis techniques on the client device. In other embodiments, a web browser client 2210 provides a user interface through which an operator submits infrastructure binaries for analysis and reviews security reports, while the computationally intensive analysis processes execute on server systems 2155 or cloud services 2180. IoT/edge clients 2215 may serve as sources of infrastructure binaries to be analyzed (for example, by extracting firmware from IoT devices for submission to the analysis system) or may execute lightweight analysis components locally, with more resource-intensive analysis delegated to server-side or cloud-based components. In some embodiments, the infrastructure binaries analyzed by the security vulnerability detection system include firmware, bootloader code, or driver code extracted from or intended for deployment on mobile clients 2110, desktop clients 2115, or IoT/edge clients 2215.

Network infrastructure 2220 interconnects the client systems 2105 with the server systems 2155 and cloud services 2180. Network infrastructure 2220 includes routers/gateways 2225 that route traffic between network segments. The client systems 2105 may communicate with server systems 2155 and cloud services 2180 through a local area network 2140, a wide area network/internet 2145, or a content delivery network 2150. The local area network 2140 may connect client systems 2105 within an organizational network to locally hosted server systems 2155. The wide area network/internet 2145 may connect geographically distributed client systems 2105 to centralized or cloud-hosted analysis infrastructure. The content delivery network 2150 may distribute rule set updates, signature database updates, machine learning model updates, and other analysis resources to geographically distributed instances of the security vulnerability detection system with reduced latency. In some embodiments, infrastructure binaries for network equipment (including firmware for devices functionally similar to routers/gateways 2225) are themselves subjects of analysis by the security vulnerability detection system.

Server systems 2155 may host the computationally intensive components of the security vulnerability detection system. An application server 2160 may execute the core analysis pipeline, including the decompilation process, the symbolic execution engine, the emulation environment, and the pattern matching processes. A web server 2165 may host the web-based user interface through which operators submit binaries, configure analysis parameters, author domain-specific language rules, and retrieve security reports. A database server 2170 may host the vulnerability databases, the searchable knowledge base used by the retrieval-augmented generation system, the similarity search index for embeddings, and the historical repository of analysis results. A file/storage server 2175 may store the corpus of infrastructure binaries received for analysis, training datasets, trained model artifacts, and generated security reports. In some embodiments, the server systems 2155 are deployed on dedicated physical hardware. In other embodiments, the server systems 2155 are deployed on virtual machines, containers, or serverless functions within cloud services 2180.

Cloud services 2180 may provide scalable computational resources for the security vulnerability detection system. A load balancer 2185 may distribute incoming analysis requests across multiple instances of the analysis pipeline, enabling the system to process multiple infrastructure binaries concurrently and to scale processing capacity in response to demand. An API gateway 2210 may provide a programmatic interface through which external systems (such as continuous integration/continuous deployment pipelines, device management platforms, or security orchestration systems) submit infrastructure binaries for analysis and retrieve security reports without requiring direct user interaction.

Cloud compute 2190 resources may host analysis pipeline instances and may include virtual machines 2195 providing isolated execution environments for the decompilation, emulation, symbolic execution, and pattern matching processes. In some embodiments, each analysis task executes within a dedicated virtual machine 2195 to provide isolation between analysis of different infrastructure binaries, preventing any analyzed code from affecting other analysis processes. Container services 2200 may host containerized instances of individual analysis components (such as the decompiler, the emulation engine, the symbolic execution engine, or individual pattern matching modules), enabling independent scaling of each component based on workload characteristics. Serverless functions 2205 may execute lightweight or event-triggered analysis tasks, such as initial binary triage, signature-based pre-screening, or notification generation upon completion of analysis.

Cloud storage 2215 may store infrastructure binaries, analysis artifacts, trained machine learning models, and security reports in a durable, scalable storage layer accessible to all analysis components. Database as a service 2220 may host the vulnerability database, the knowledge base, and the embedding similarity index, providing managed database infrastructure with automatic scaling, replication, and backup capabilities.

Data flow services 2225 may orchestrate the movement of data between analysis components in distributed deployments. A message queue 2230 may decouple the submission of infrastructure binaries from their analysis, enabling asynchronous processing in which binaries are queued for analysis and processed as computational resources become available. The message queue 2230 may also facilitate communication between the specialized artificial intelligence agents in the multi-agent system, carrying discovery messages, hypothesis messages, evidence messages, and coordination messages between agents executing on different computing nodes.

Stream processing 2235 may enable real-time processing of analysis events, including the continuous aggregation of findings from multiple analysis techniques as they complete, the real-time updating of the integrated output model, and the streaming delivery of partial analysis results to operators monitoring analysis progress. Batch processing 2240 may be used for large-scale analysis campaigns in which a corpus of infrastructure binaries (for example, all firmware images within an organization's asset inventory) is submitted for analysis as a batch, with results aggregated upon completion. An ETL (extract, transform, load) pipeline 2245 may be used to ingest infrastructure binaries from external sources (such as firmware repositories, build systems, or device management platforms), transform them into a format suitable for the analysis pipeline (including extraction of individual executable components), and load them into the analysis workflow. The ETL pipeline 2245 may also transform raw analysis outputs into structured formats suitable for storage in the database server 2170 or database as a service 2220, and for presentation in security reports.

In some embodiments, the security vulnerability detection system is deployed entirely within a single client computing architecture 1100 as depicted in FIG. 9, with all analysis processes executing locally. In other embodiments, the system is deployed across the server-client network architecture 2100 as depicted in FIG. 10, with analysis components distributed across server systems 2155 and cloud services 2180. In still other embodiments, a hybrid deployment distributes analysis processes between a local client computing architecture 1100 and remote server or cloud resources based on computational requirements, data sensitivity constraints, or network availability. The claims are not limited to any particular deployment configuration.

It bears noting that many of the components depicted in FIG. 9 and FIG. 10 are themselves examples of infrastructure components whose firmware, drivers, and low-level software constitute infrastructure binaries that may be analyzed by the security vulnerability detection system. For example, the firmware of the storage controller 1155, the network interface controller 1180, the GPU 1125, the AI/ML processing unit 1130, the routers/gateways 2225, and the load balancer 2185 each represents an infrastructure binary that may be received, extracted, and analyzed using the methods and systems disclosed herein. The security vulnerability detection system is therefore applicable both to the computing infrastructure on which it executes and to the computing infrastructure of other systems whose binaries are submitted for analysis.

CONCLUSION

Throughout this disclosure, various terms and phrases are used to describe features of the disclosed technology. It is to be understood that these terms and phrases may encompass a variety of meanings and definitions, as is common in the field of technology and patent law. The definitions of these terms may vary depending on the context in which they are used, the specific embodiment being described, or the interpretation of the technology by those skilled in the art.

In various embodiments, certain variable names, symbols, or labels may be used in the claims to represent various elements, components, or steps of the described methods, systems, and apparatuses. These variable names, symbols, or labels are provided for convenience and clarity in describing the claimed subject matter. However, it should be understood that the use of such variable names, symbols, or labels in the claims does not necessarily limit these elements, components, or steps to being the same specific entities described in the specification or in other parts of the disclosure. The variable names, symbols, or labels used in the claims should be interpreted broadly and may encompass various implementations, variations, or equivalents of the described elements, components, or steps, unless explicitly stated otherwise or clearly limited by the context of the claim. As such, the scope of the claims is not confined to the specific examples or embodiments described in the specification, but rather extends to the full breadth of the inventive concepts disclosed herein.

As used herein, the term "vulnerability" refers to any weakness, flaw, defect, or condition in software, firmware, hardware, or any combination thereof that may be exploited, triggered, or leveraged to compromise the security, integrity, availability, confidentiality, or intended operation of a system, component, or data. This definition encompasses a broad spectrum of security-relevant conditions. Non-limiting examples of vulnerabilities may include buffer overflows, integer overflows, use-after-free errors, null pointer dereferences, race conditions, time-of-check to time-of-use (TOCTOU) vulnerabilities, format string vulnerabilities, injection flaws, authentication bypasses, authorization failures, cryptographic weaknesses, information disclosure conditions, denial of service conditions, privilege escalation paths, memory corruption issues, logic errors, input validation failures, boundary condition errors, resource exhaustion conditions, and configuration weaknesses. The term also encompasses vulnerabilities arising from design flaws, implementation errors, integration issues, or environmental factors. Vulnerabilities may exist at any level of abstraction, including machine code, assembly instructions, intermediate representations, source code, protocols, interfaces, or architectural designs. The term further includes zero-day vulnerabilities for which no patch or mitigation exists, known vulnerabilities catalogued in databases such as the Common Vulnerabilities and Exposures (CVE) system, and latent vulnerabilities that have not yet been discovered or disclosed. Vulnerabilities may be intentionally introduced, accidentally created, or may emerge from the interaction of otherwise benign components.

As used herein, the term "malware" refers to any software, code, script, payload, or executable component that is designed, intended, or capable of performing unauthorized, malicious, harmful, deceptive, or otherwise undesirable operations on a computing system, network, device, or data. This definition encompasses a broad range of malicious software categories. Non-limiting examples of malware may include viruses, worms, trojans, ransomware, spyware, adware, keyloggers, rootkits, bootkits, fileless malware, polymorphic malware, metamorphic malware, logic bombs, droppers, downloaders, stagers, command and control (C2) agents, remote access trojans (RATs), banking trojans, cryptominers, wipers, and any hybrid or novel forms of malicious code. The term includes malware that operates at any level of the computing stack, including application-level malware, kernel-level malware, firmware-level malware, bootloader malware, and hardware-implanted malicious code. Malware may employ various techniques to evade detection, and non-limiting examples of such techniques may include obfuscation, encryption, packing, anti-analysis mechanisms, sandbox evasion, virtual machine detection, and timing-based evasion. The term also encompasses potentially unwanted programs (PUPs), grayware, and dual-use tools that may be employed for malicious purposes. Malware may be delivered through various vectors including network transmission, removable media, supply chain compromise, social engineering, or physical access. The definition extends to malware components, fragments, artifacts, indicators of compromise (IOCs), and behavioral signatures associated with malicious software.

As used herein, the term "backdoor" refers to any mechanism, code, functionality, access path, or condition that provides unauthorized, covert, hidden, undocumented, or alternative access to a system, component, network, data, or functionality, bypassing normal authentication, authorization, or security controls. This definition encompasses a broad range of unauthorized access mechanisms. Non-limiting examples of backdoors may include hardcoded credentials, hidden accounts, undocumented administrative interfaces, covert communication channels, debug interfaces left in production code, maintenance access mechanisms, master passwords, authentication bypasses, privilege escalation paths, reverse shells, bind shells, web shells, implants, beacons, and persistent access mechanisms. The term includes backdoors that may be intentionally inserted by malicious actors, inadvertently introduced through development practices, or present as undocumented features. Backdoors may operate at any level of the computing stack, and non-limiting examples may include application backdoors, operating system backdoors, firmware backdoors, bootloader backdoors, and hardware backdoors. The term also encompasses supply chain implants, nation-state implants, advanced persistent threat (APT) implants, and any mechanism designed to maintain persistent unauthorized access across system reboots, updates, or security remediation efforts. Backdoors may communicate through various channels, and non-limiting examples of such channels may include network protocols, covert channels, steganographic methods, or out-of-band communication mechanisms. The definition extends to dormant backdoors that await activation, time-triggered backdoors, event-triggered backdoors, and backdoors that require specific conditions or inputs to activate.

Throughout this disclosure and the claims, unless the context clearly indicates otherwise or it would be technically inappropriate or impossible, the terms "vulnerability," "malware," "backdoor," and related terms such as "implant," "threat," "security issue," "security flaw," "malicious code," "exploit," and "compromise" may be used interchangeably to refer broadly to any condition, code, mechanism, or artifact that poses a security risk, enables unauthorized access, compromises system integrity, or otherwise represents a deviation from intended secure operation. This interchangeable usage reflects the recognition that these categories frequently overlap in practice, as vulnerabilities may be exploited by malware, malware may install backdoors, backdoors may introduce new vulnerabilities, and a single artifact may simultaneously exhibit characteristics of multiple categories. The detection techniques, analysis methods, pattern matching processes, and reporting mechanisms described herein are generally applicable across these categories, and references to detecting or analyzing one category should be understood to encompass detection and analysis of related categories unless explicitly limited. The unified analytical model, integrated outputs, and security reports described herein may address any combination of vulnerabilities, malware, backdoors, implants, and related security threats without distinction unless specifically indicated. This broad and interchangeable interpretation ensures comprehensive coverage of the security threat landscape and reflects the practical reality that security analysis systems must address the full spectrum of threats regardless of categorical boundaries.

As used herein, the term "infrastructure components" refers to low-level software elements that execute on hardware to provide foundational functionality for computing systems. Infrastructure components represent the modular units of software that operate at a privileged level within computing systems, often with direct access to hardware resources. Non-limiting examples of infrastructure components may include firmware, bootloaders, drivers, platform initialization modules, runtime services, option ROMs, kernel modules, embedded system software, and other software that interacts directly with hardware interfaces. Infrastructure components may manage hardware resources, control system startup sequences, facilitate communication between hardware and higher-level software, and provide essential services upon which operating systems and applications depend. The term encompasses both individual software modules and collections of related modules that together provide infrastructure-level functionality.

As used herein, the term "infrastructure binaries" refers to compiled, executable representations of infrastructure components in machine-readable format. Infrastructure binaries may include firmware images, driver binaries, bootloader code, and other executable files that implement infrastructure-level functionality. Infrastructure binaries may be organized according to platform-specific formats and may contain nested components, compressed data, encrypted regions, or hierarchical container structures. The term encompasses binaries targeting various processor architectures, including but not limited to x86, x64, ARM, MIPS, PowerPC, and RISC-V. Infrastructure binaries may lack source code, debugging information, or documentation, and may employ custom instruction sets, compiler optimizations, or obfuscation techniques. The term includes both individual executable files and composite binary images containing multiple embedded components.

As used herein, the term "infrastructure code" refers to software characterized by predictable execution flows and extensive component reuse, designed explicitly to enable hardware operation and management. Infrastructure code operates at a lower level of abstraction than general-purpose application software, interacting directly with system resources, hardware registers, and physical components. Infrastructure code implements specific, hardware-centric functionalities and may execute with privileged access to hardware resources.

The scope of infrastructure code encompasses multiple layers of the computing stack. For general computing devices such as laptops, desktops, and servers, infrastructure code includes system firmware such as UEFI, BIOS, and security processor firmware including Intel Management Engine (ME) and AMD Platform Security Processor (PSP); core logic firmware such as CPU microcode and Trusted Platform Module (TPM) firmware; peripheral and component firmware such as SSD and NVMe controller firmware, NIC firmware, PCI Expansion ROMs (XROM), USB controller firmware, and GPU firmware; bootloaders and initialization code including primary and secondary bootloaders such as GRUB and U-Boot, as well as proprietary OEM bootloaders and hardware initialization sequences; and drivers and kernel modules including Windows kernel-space drivers, Linux kernel modules, and device drivers for memory-mapped I/O (MMIO) operations.

For specialized networking and industrial equipment such as routers, switches, load balancers, and firewalls from manufacturers including Cisco, Juniper, and F5, infrastructure code encompasses the full operating system and firmware stack running on the device, including the network operating system such as Cisco IOS, Junos, or similar specialized operating systems that function as the device's firmware, as well as component-specific firmware running on line cards, switching fabrics, network processors, and other dedicated hardware components within the device.

Infrastructure code may exist in a hierarchical relationship within a single device, wherein multiple distinct infrastructure code components operate at different levels and on different hardware elements. For example, a single computing device may contain UEFI firmware governing system initialization, separate firmware for storage controllers, distinct firmware for network interfaces, and additional firmware for security processors, each representing independent infrastructure code components subject to analysis.

As used herein, the term "infrastructure code binaries" refers to infrastructure binaries that are subject to analysis within a binary analysis framework. The term emphasizes the code content of infrastructure binaries as the subject of security analysis operations, including decompilation, emulation, symbolic execution, and pattern matching. Infrastructure code binaries may be received by a security vulnerability detection system, extracted and decomposed into individual executable components, and processed through multiple analysis techniques to detect vulnerabilities, malware, and implants. The term may be used interchangeably with "infrastructure binaries" when referring to binaries undergoing security analysis.

The terms "infrastructure code," "infrastructure components," "infrastructure binaries," and "infrastructure code binaries" may be used interchangeably throughout this disclosure where context permits, unless the context clearly indicates otherwise. However, "infrastructure components" and "infrastructure code" may refer to software more broadly, including source code or uncompiled representations, while "infrastructure binaries" and "infrastructure code binaries" specifically refer to compiled, executable representations in machine-readable format.

As used herein, the term "domain-specific language" or "DSL" refers to a specialized programming language, notation, or specification format designed for a particular application domain. In the context of security vulnerability detection, the DSL may provide a structured environment for defining, managing, and executing detection rules and analysis configurations. The DSL may be non-Turing complete, meaning it may employ bounded loops, restricted recursion, or other constraints that enable predictable execution times and resource consumption, though in some cases the DSL may support broader computational capabilities as appropriate for specific analysis tasks.

The DSL may serve as an orchestration mechanism that coordinates the application, prioritization, and execution of multiple analysis techniques within an analytical framework. The DSL may specify rule triggers, execution order, data flow between analysis components, and conditions under which different analysis techniques are invoked. The DSL may define how outputs from one analysis technique inform or feed into subsequent techniques, enabling coordinated multi-stage analysis workflows.

The DSL may include constructs for specifying pattern matching criteria, including syntactic patterns, semantic patterns, behavioral patterns, and structural patterns. The DSL may provide mechanisms for defining data flow analyses, control flow analyses, taint tracking rules, and state machine specifications. The DSL may support parameterized templates that can match variations of patterns, enabling flexible detection of related threats or vulnerability classes.

The DSL may include constructs for specifying rule applicability conditions based on binary characteristics, including binary type, processor architecture, operating system environment, file format, or detected component type. The DSL may define execution parameters such as timeout limits, memory bounds, thread allocation, analysis depth, and resource constraints. The DSL may support conditional rule execution based on findings from prior analysis stages or based on characteristics discovered during analysis.

The DSL may aggregate and manage multiple rule types, including signature-based rules, decompiler output patterns, disassembly patterns, symbolic execution constraints, behavioral specifications, and machine learning model configurations. The DSL may provide versioning capabilities, dependency management, and conflict resolution mechanisms for rule sets. The DSL may enable rapid updates and incorporation of new detection rules without requiring system reinstallation, recompilation, or significant reconfiguration.

The DSL may facilitate interoperability between analysis components by defining standard data formats, interfaces, and exchange protocols. The DSL may specify how analysis results are represented, communicated, and combined across different components of the analytical framework. The DSL may include interfaces for importing external data sources, threat intelligence feeds, vulnerability databases, or third-party rule sets.

The DSL may support domain-specific constructs tailored to infrastructure binary analysis, including constructs for hardware register access patterns, interrupt handler signatures, memory-mapped I/O operations, device-specific protocol implementations, boot sequence specifications, and firmware-specific data structure layouts. The DSL may provide abstractions appropriate to different infrastructure component types, including firmware, bootloaders, drivers, and embedded system software.

The term "DSL" as used herein encompasses textual languages, graphical notations, configuration formats, declarative specifications, and any other formalism suitable for expressing detection rules and analysis configurations within the described systems and methods.

Throughout this disclosure, various terms and phrases describe features of the disclosed technology. Unless explicitly defined herein or clearly limited by context, all terms and phrases are to be interpreted according to their ordinary and customary meaning as understood by a person of ordinary skill in the relevant art at the time of filing. The terms and phrases used in this specification are to be given their broadest reasonable interpretation consistent with the specification in the jurisdiction in which protection is sought.

The use of the word "a" or "an" when used in conjunction with the term "comprising" and similar open-ended transitional phrases in the claims is to be interpreted as meaning "one or more." The use of the term "or" is intended to be inclusive, such that "A or B" includes A alone, B alone, or both A and B together, unless explicitly stated otherwise or the context clearly requires mutual exclusion.

The transitional phrase "comprising" and its variants ("comprises," "including," "containing") are open-ended and do not exclude additional, unrecited elements, steps, or components. The transitional phrase "consisting of" is closed and excludes any element, step, or component not specified in the claim. The transitional phrase "consisting essentially of" limits the scope to the specified elements, steps, or components and those that do not materially affect the basic and novel characteristics of the claimed invention.

Reference throughout the specification to "one embodiment," "an embodiment," "some embodiments," "in certain implementations," and similar phrases means that a particular feature, structure, or characteristic described in connection with that embodiment is included in at least one embodiment of the present disclosure. Such references do not necessarily refer to the same embodiment, and the referenced features, structures, or characteristics may be combined in any suitable manner across different embodiments without limitation. The absence of a feature from a particular embodiment does not imply that the feature is incompatible with that embodiment.

The use of ordinal terms such as "first," "second," "third," and the like in the claims or the specification does not by itself connote any priority, precedence, order, temporal sequence, or ranking among the elements they modify. These terms are used solely to distinguish one element or step from another. Unless the claim language or specification explicitly states a required ordering, no ordering is implied.

The use of the term "may" indicates that the described action, feature, or characteristic is possible or permitted but not mandatory. This term describes optional or alternative aspects of the disclosed technology. Similarly, the term "can" describes capability, not requirement.

The use of the terms "approximately," "substantially," "about," and similar terms of degree when modifying a value, dimension, condition, or relationship means within a range of tolerance that would be understood as acceptable by a person of ordinary skill in the art, taking into account the particular context and any precision requirements stated in the specification.

Where the specification describes a benefit, advantage, or result achieved by the disclosed technology, such description is illustrative and is not intended to imply that every embodiment within the scope of the claims necessarily achieves that benefit, advantage, or result.

As used herein, the term "decompilation" or "decompiler" refers to any process, tool, or system that transforms compiled binary code, machine code, or intermediate representations into a higher-level representation suitable for analysis. The higher-level representation may include, without limitation, C-like pseudocode, abstract syntax trees, intermediate representations (such as static single assignment (SSA) form, three-address code, or register transfer language), control flow graphs, data flow graphs, program dependence graphs, or any other representation that facilitates understanding of the binary's structure, logic, or behavior. The term "rule-based decompiler" refers to a decompiler whose transformation logic is governed, at least in part, by configurable rules, including rules expressed in a domain-specific language. The decompilation process may incorporate interprocedural analysis, type recovery, structure reconstruction, calling convention inference, and any other reverse engineering technique. The claims are not limited to any particular decompiler architecture, intermediate representation format, or reverse engineering methodology unless explicitly stated.

As used herein, the term "emulation" or "emulation environment" refers to any process, tool, or system that simulates the execution of binary code in a controlled environment. The emulation environment may simulate processor instruction sets, memory architectures, hardware registers, peripheral interfaces, interrupt controllers, direct memory access (DMA) controllers, and any other hardware or firmware interfaces relevant to the execution of the binary under analysis. The emulation may be full-system emulation, user-mode emulation, partial emulation of selected hardware components, or any combination thereof. The term encompasses dynamic binary translation, interpretation, just-in-time compilation, and any other technique for executing or simulating binary code outside its native hardware environment. The emulation environment may record execution traces, memory access patterns, system call sequences, register state changes, and other runtime behavioral data for use in subsequent analysis steps.

As used herein, the term "symbolic execution" or "symbolic execution engine" refers to any process, tool, or system that analyzes binary code by treating some or all input values as symbolic variables rather than concrete values, and that propagates these symbolic values through program logic to determine conditions under which particular execution paths are reached or particular program states are achieved. Symbolic execution encompasses both pure symbolic execution (in which all inputs are symbolic) and concolic execution (in which concrete and symbolic execution are combined). The term includes bounded symbolic execution in which exploration is limited by path depth, time constraints, or resource budgets. Symbolic execution may be used to generate test inputs, verify the reachability of code paths, confirm the exploitability of identified vulnerabilities, or identify conditions under which particular behaviors occur. The claims are not limited to any particular constraint solver, path exploration strategy, or symbolic execution framework unless explicitly stated.

As used herein, the term "pattern matching" refers to any process, tool, or system that compares code, data, behavior, or structural representations against predefined or learned patterns to identify matches, similarities, or anomalies. Pattern matching encompasses, without limitation: signature-based matching using byte patterns, opcode sequences, or string signatures (including YARA rules and similar formalisms); semantic pattern matching that operates on semantic representations of code rather than syntactic or structural features; behavioral pattern matching that identifies patterns in runtime behavior, API call sequences, system call sequences, or state transitions; functional similarity analysis that compares structural or behavioral representations (such as embeddings or feature vectors) of code segments to identify functionally equivalent or similar code; and anomaly detection that identifies patterns deviating from expected or baseline behavior. Pattern matching may operate on raw binary data, disassembled instructions, decompiled code, intermediate representations, control flow graphs, data flow graphs, execution traces, or any other representation of the binary or its behavior.

As used herein, the terms "control flow graph" or "CFG" refer to a directed graph representation of the possible execution paths through a program or program component, in which nodes represent basic blocks (sequences of instructions with a single entry and exit point) and edges represent possible transfers of control between blocks. The term encompasses intraprocedural control flow graphs (representing flow within a single function) and interprocedural control flow graphs (representing flow across function boundaries, including call graphs and their integration with per-function CFGs). The term also encompasses program dependence graphs that combine control flow and data dependency information into a unified representation.

As used herein, the terms "embedding," "embeddings," or "vector representation" refer to numerical vector representations of code segments, functions, basic blocks, instructions, or other program elements in a continuous vector space. Embeddings may capture semantic, structural, syntactic, or behavioral properties of the represented elements, and may be generated by any technique, including trained neural network models, graph-based encoding methods, statistical feature extraction, or any other method that produces a fixed-dimensional numerical representation suitable for comparison, classification, clustering, or similarity search.

As used herein, the term "machine learning model" or "model" refers to any computational model that learns patterns, relationships, or decision boundaries from data. This definition encompasses, without limitation: supervised learning models trained on labeled datasets (including classifiers, regressors, and sequence-to-sequence models); unsupervised learning models that identify structure in unlabeled data (including clustering algorithms, dimensionality reduction techniques, and autoencoders); semi-supervised and self-supervised learning models; reinforcement learning models; and any hybrid or ensemble approach combining multiple learning paradigms.

Without limitation, specific model architectures referenced in this disclosure (including convolutional neural networks (CNNs), graph neural networks (GNNs), long short-term memory (LSTM) networks, transformer-based models, random forest classifiers, and Markov models) are illustrative and do not limit the claims to those specific architectures. A claim reciting a particular model type encompasses any model architecture that performs the described function. For example, a reference to a "random forest classifier trained on labeled vulnerability datasets for anomaly detection" encompasses any supervised or semi-supervised classification model trained on labeled data to distinguish between vulnerable and non-vulnerable code patterns, including but not limited to random forests, gradient-boosted trees, support vector machines, neural network classifiers, and any other model capable of performing the described classification task. Similarly, a reference to "convolutional neural networks trained on disassembled code patterns" encompasses any machine learning architecture suitable for learning patterns from sequential or structured representations of disassembled code, including but not limited to CNNs, recurrent neural networks, transformer architectures, and graph neural networks.

As used herein, the terms "training," "trained," or "training process" refer to any procedure by which a machine learning model's parameters, weights, or internal representations are adjusted based on data. Training encompasses supervised training on labeled datasets, unsupervised training on unlabeled data, fine-tuning of pre-trained models, transfer learning, continual or incremental learning, few-shot and zero-shot learning, and any other procedure that adapts a model to perform a specified task. The training data, training procedure, hyperparameters, and optimization methods described in the specification are illustrative; the claims encompass models trained using any suitable data, procedure, or optimization method that produces a model capable of performing the described function.

As used herein, the term "artificial intelligence agent" or "agent" in the context of a multi-agent system refers to any autonomous or semi-autonomous software component that performs analysis tasks, makes decisions regarding analysis strategy, communicates with other agents or system components, and contributes findings toward a shared analytical objective. Agents may be implemented using rule-based logic, machine learning models, heuristic algorithms, planning systems, large language models, or any combination thereof. The term "multi-agent system" refers to any system comprising two or more such agents that coordinate their activities through message passing, shared memory, blackboard architectures, auction mechanisms, or any other coordination framework.

As used herein, the term "retrieval-augmented generation" or "RAG" refers to any system or process that augments the analysis, generation, or decision-making capabilities of a computational model by dynamically retrieving relevant information from an external knowledge base, database, or corpus during processing. The retrieval mechanism may use embedding-based similarity search, keyword search, semantic search, approximate nearest neighbor algorithms, or any other information retrieval technique. The retrieved information may include code snippets, vulnerability reports, malware signatures, API documentation, hardware specifications, threat intelligence, or any other contextual data relevant to the analysis task.

As used herein, the term “processor” refers to any computing entity capable of executing instructions or performing operations, whether implemented in hardware, firmware, software, or any combination thereof. The term encompasses, without limitation, general-purpose processors (CPUs), graphics processing units (GPUs), digital signal processors (DSPs), application-specific integrated circuits (ASICs), field-programmable gate arrays (FPGAs), tensor processing units (TPUs), neural processing units (NPUs), system-on-chip (SoC) designs, multi-core and many-core processors, cryptographic accelerators, secure enclaves and trusted execution environments, cloud-based and virtualized processing resources, edge computing processors, and any future processing technology. The term “processor” also encompasses the associated memory hierarchy (including registers, cache, RAM, and persistent storage) that operates in conjunction with the processing unit. Any reference to “a processor” should be interpreted broadly to include any processing entity capable of performing the described functions, regardless of its architecture, instruction set, or physical form.

As used herein, the terms “memory,” “storage,” “store,” “storing,” and variants thereof refer to any mechanism, medium, device, or system for recording, retaining, and retrieving data in any format. These terms encompass volatile memory, non-volatile memory, persistent storage, distributed and cloud storage, in-memory data structures, and any emerging storage technology. The terms do not imply any particular duration of data retention, any particular storage technology, or any particular access pattern unless explicitly stated.

As used herein, the term “database” refers to any organized collection of data that supports storage, retrieval, and management operations, including relational databases, NoSQL databases (including document, key-value, columnar, and graph databases), in-memory databases, distributed databases, vector databases, time-series databases, knowledge graphs, searchable knowledge bases, similarity search indices, and any other system for structured or semi-structured data persistence and retrieval. In the context of this disclosure, where the system constructs or queries a knowledge base, vulnerability database, signature database, or similarity database, any of the foregoing database technologies may serve that role.

As used herein, the terms “network,” “communication channel,” “channel,” “link,” and variants thereof refer to any medium, mechanism, or infrastructure for conveying data between two or more entities, including wired and wireless networks, local area networks and wide area networks, the internet, intranets, peer-to-peer connections, and any combination thereof. Where the specification describes transmitting a security report to a remote security monitoring system or receiving an infrastructure binary from a remote source, any network transport mechanism may serve that role.

As used herein, the term “non-transitory computer-readable medium” or “computer-readable storage medium” refers to any tangible medium that stores instructions or data accessible by a processor. This term explicitly excludes transitory signals per se but includes any physical medium on which data may be stored, including semiconductor memory, magnetic storage, optical storage, and any other non-transitory medium.

As used herein, the term “display” or “displaying” refers to any means, method, apparatus, or process for visually presenting or otherwise conveying information to a user, including graphical user interfaces rendered on screens, monitors, or other display devices; web-based dashboards and reporting interfaces; programmatic outputs to files, logs, or data streams; and any other mechanism by which the contents of a security report or analysis result are made perceivable or accessible to a human user or to a downstream automated system.

The methods, systems, and apparatuses described herein provide specific, concrete, and tangible improvements to the security analysis of computing systems by enabling the automated detection of vulnerabilities, malware, and backdoors within infrastructure binaries. The disclosed techniques are not recited as abstract ideas standing alone but rather as specific, technically grounded analysis operations performed by computing hardware on binary executable data to achieve practical security outcomes.

The disclosed system addresses specific technical problems in the field of computer security: the difficulty of analyzing low-level infrastructure binaries that lack source code and debugging information, the challenge of detecting threats that span multiple levels of code abstraction, and the limitation of individual analysis techniques (each of which, in isolation, may miss threats detectable by other approaches). The disclosed solution combines multiple complementary analysis techniques (decompilation, emulation, symbolic execution, and pattern matching) into an integrated analytical framework, orchestrated by a domain-specific language, that produces results exceeding what any individual technique achieves alone. This integration of heterogeneous analysis techniques into a coordinated pipeline, with cross-technique correlation of findings and unified reporting, represents a concrete technical improvement to binary analysis systems.

The machine learning models described herein are not generic classifiers applied to abstract data. They are specifically trained on datasets of infrastructure binary code (including firmware samples from diverse embedded systems, binaries compiled for multiple processor architectures, and labeled examples of known vulnerabilities and malware) and are applied to domain-specific representations (including code embeddings, control flow graphs, program dependence graphs, and behavioral traces) to perform domain-specific classification and anomaly detection tasks. The trained models, the domain-specific representations on which they operate, and the integrated analysis pipeline in which they participate together constitute a practical technical system for improving the security of computing infrastructure.

Where the specification describes machine learning operations, pattern matching operations, symbolic execution operations, or other computational analysis steps as components of the claimed methods and systems, those operations are recited as components of a larger technical process that, taken as a whole, effects a transformation of raw binary data into actionable security intelligence. The claims are directed to the specific technical means by which the described security analysis is performed, not to the underlying mathematical or statistical concepts in the abstract.

The phrases “configured to,” “operable to,” and “adapted to” when used in connection with a system, device, component, or module mean that the element is structurally arranged, programmed, or designed in a manner that enables it to perform the stated function. The phrase “configured to” does not require that the element perform the function at all times or in all operating modes; it requires that the element possess the structural or programmatic capability to perform the function when appropriately invoked or activated. A “module” configured to perform a function may be implemented as a software component, a hardware component, a firmware component, a cloud-hosted service, a containerized microservice, or any combination thereof.

Where the specification discloses an algorithm or computational procedure in prose, in a flowchart, in pseudocode, or in any other form, each of these forms of disclosure independently provides sufficient algorithmic structure for purposes of any means-plus-function analysis under 35 U.S.C. § 112(f).

Where the claims or specification use temporal or causation language such as "in response to," "based on," "upon," "after," "before," "when," "during," "while," "in parallel with," or similar terms, these terms do not require immediate temporal succession or sole causation unless explicitly stated. "In response to" an event or condition means that the event or condition is at least one factor that triggers, causes, or contributes to the described action. "Based on" a value or input means that the value or input is at least one factor considered or used in the described computation or decision. "In parallel with" means that the described processes have overlapping execution periods, but does not require simultaneous initiation, simultaneous completion, or identical execution durations. These terms describe causal and temporal relationships at a functional level and do not impose precise timing constraints unless the specification or claims explicitly provide such constraints.

Where the specification describes performing multiple analysis techniques "simultaneously," "in parallel," or "concurrently," these terms indicate that the described processes may execute with overlapping time periods. They do not require that all processes begin at the same instant, proceed at the same rate, or complete at the same time. The processes may be executed on separate processor cores, separate computing nodes, separate threads within a single processor, in time-multiplexed fashion on a single core, or in any combination thereof. The degree of parallelism is an implementation choice that does not limit the scope of the claims.

Where the specification describes a particular means, mechanism, component, or technique for achieving a function or result, any alternative means, mechanism, component, or technique that achieves the same function or result in a substantially similar way is within the scope of the disclosure. This statement of functional equivalence is consistent with the Doctrine of Equivalents and is provided to inform claim construction.

The foregoing descriptions of specific embodiments are presented for purposes of illustration and description. They are not intended to be exhaustive or to limit the invention to the precise forms disclosed. Many modifications, variations, and alternative implementations will be apparent to practitioners skilled in the art in light of the above teaching. The embodiments were chosen and described to explain the principles of the invention and its practical application, to thereby enable others skilled in the art to make and use the invention and various embodiments with various modifications as are suited to the particular use contemplated.

The scope of the invention is not limited to the specific embodiments, machine learning model architectures (including the specific use of convolutional neural networks, graph neural networks, LSTM networks, random forest classifiers, or transformer models), training datasets, processor architectures (including x86, ARM, MIPS, PowerPC, or RISC-V), binary formats, decompiler implementations, emulation frameworks, symbolic execution engines, pattern matching formalisms, domain-specific language syntax, or implementation details described in the specification. The claims are to be interpreted according to their terms and in view of the specification, encompassing all equivalents to which such claims are entitled.

Elements, features, and steps described in the context of one embodiment may be omitted, combined with elements from other embodiments, or rearranged in different configurations, unless such omission, combination, or rearrangement would be understood by a person of ordinary skill in the art as fundamentally incompatible with the described function. The inclusion of specific model architectures, training parameters, analysis tool names, binary format specifications, processor architecture identifiers, or implementation details is illustrative and not limiting.

The invention claimed is:

1. A computer-implemented method for detecting vulnerabilities, malware and implants within infrastructure binaries, the method comprising:

(a) receiving, by a computing device, an infrastructure binary exhibiting predictable execution flows and component reuse patterns associated with infrastructure components;

(b) extracting the infrastructure binary using binary analysis tools to decompose and retrieve individual executable components, thereby producing an extracted binary;

(c) applying multiple analysis techniques to the extracted binary, comprising:

(i) performing a decompilation process on the extracted binary using a rule-based decompiler that:

utilizes interprocedural analysis to trace function calls, variable usage, and pointer references, implements reverse engineering techniques comprising type recovery and discovery using convolutional neural networks trained on disassembled code patterns, constructs control flow graphs through parallel processing mechanisms, and conducts a whole-program analysis to detect cross-function behaviors indicative of threats;

(ii) performing an emulation process on the extracted binary within an emulation environment configured to simulate hardware interfaces;

(d) performing a symbolic execution process on the extracted binary in parallel with the decompilation and emulation processes, comprising:

(i) generating symbolic inputs tailored to infrastructure components, (ii) exploring multiple execution pathways to detect vulnerabilities, (iii) configuring the symbolic execution process with bounded execution paths, parallel CFG generation, and state management techniques, and (iv) validating identified vulnerabilities to ascertain exploitability;

(e) simultaneously executing multiple pattern matching and analysis processes on outputs from the decompilation, emulation, and symbolic execution processes, comprising:

(i) semantic pattern matching, (ii) functional similarity analysis, (iii) behavioral pattern matching, and (iv) random forest classifier trained on labeled vulnerability datasets for anomaly detection;

(f) integrating, into a unified model, outputs from at least two of: the decompilation process, the emulation process, the symbolic execution process, and the pattern matching and analysis processes;

(g) conducting an examination of the integrated outputs to detect threats;

(h) generating a security report detailing detected issues, severity ratings, and contextual data; and (i) electronically storing the security report locally or displaying the security report on a user interface of the computing device, wherein the security report includes information identifying which combination of the multiple analysis techniques contributed to each detection.

2. The method of claim 1, further comprising performing signature-based detection with integrated false positive control by:

(a) incorporating a dedicated domain-specific language (DSL) as an integrating orchestration mechanism within an analytical framework;

(b) implementing a Markov model-based false positive estimation module that predicts false positive probabilities;

(c) implementing an automated calibration process for the Markov model-based false positive estimation module; and (d) enabling streamlined and expedited updates to detection types through the DSL.

3. The method of claim 1, further comprising performing disassembly-based detection using a pattern matching system with a Markov model by:

(a) implementing a disassembly pattern matching with an associated pattern language integrated into a rule DSL;

(b) utilizing a Markov model-based statistical analysis module to evaluate assembly patterns during pattern development;

(c) leveraging the disassembly pattern matching in conjunction with the Markov model-based statistical analysis module to detect low-level or obfuscated malware;

(d) facilitating detection of assembly-level component constructs; and (e) optimizing the Markov model-based statistical analysis module through iterative training and adjustment.

4. The method of claim 1, wherein performing the whole-program analysis comprises:

(a) constructing a program dependence graph that combines control and data dependencies across the extracted binary by:

(i) integrating control flow information;

(ii) incorporating data dependency information;

(iii) synthesizing control and data dependencies into a unified graph; and (iv) applying graph neural networks to analyze the program dependence graph;

(b) applying abstract interpretation techniques with custom abstract domains adapted to common firmware and driver data types.

5. The method of claim 1, wherein performing decompilation-based detection comprises:

(a) introducing the rule-based decompiler designed to utilize platform-specific rules;

(b) implementing a de-optimizer module within the rule-based decompiler;

(c) providing a compiler that translates platform-specific rules into executable decompilation components;

(d) incorporating a runtime engine that performs analysis;

(e) generating a refined intermediate representation of the extracted binary; and (f) enhancing overall accuracy and efficiency of an analysis process.

6. The method of claim 1, wherein the rule-based decompiler further comprises a reverse engineering system that:

(a) applies convolutional neural networks trained on disassembled firmware datasets for binary classification to identify and reconstruct high-level control structures specific to the infrastructure components; and (b) utilizes a domain-specific language for defining and applying component transformation rules for firmware decompilation.

7. The method of claim 1, further comprising implementing a retrieval-augmented generation (RAG) system that:

(a) constructs a searchable knowledge base containing component snippets, vulnerability reports, malware signatures, API documentation, and hardware specifications;

(b) generates component embeddings for functions and basic blocks;

(c) performs similarity searches using approximate nearest neighbor algorithms; and (d) augments detection capabilities by dynamically retrieving and incorporating relevant contextual information during analysis.

8. The method of claim 1, further comprising implementing a multi-agent system with goal coordination that:

(a) deploys specialized artificial intelligence agents that focus on different analysis techniques and share insights through a message-passing coordination framework;

(b) dynamically allocates analytical tasks based on binary characteristics and initial findings;

(c) enables goal-oriented analysis where the specialized artificial intelligence agents define and pursue specific analytical objectives; and (d) integrates with dynamic analysis frameworks to automate debugging tasks.

9. A system for detecting vulnerabilities, malware and implants within infrastructure binaries, the system comprising:

a processor; and a memory storing instructions that, when executed by the processor, cause the system to:

(a) receive an infrastructure binary exhibiting predictable execution flows and component reuse patterns associated with infrastructure components;

(b) extract the infrastructure binary using binary analysis tools to decompose and retrieve individual executable components, thereby producing an extracted binary;

(c) apply multiple analysis techniques to the extracted binary, comprising:

(i) performing a decompilation process on the extracted binary using a rule-based decompiler that:

utilizes interprocedural analysis to trace function calls, variable usage, and pointer references, implements reverse engineering techniques comprising type recovery and discovery using convolutional neural networks trained on disassembled code patterns, constructs control flow graphs (CFGs) through parallel processing mechanisms, and conducts a whole-program analysis to detect cross-function behaviors indicative of threats;

(ii) performing an emulation process on the extracted binary within an emulation environment configured to simulate hardware interfaces;

(d) perform a symbolic execution process on the extracted binary in parallel with the decompilation and emulation processes, comprising:

(i) generating symbolic inputs tailored to infrastructure components, (ii) exploring multiple execution pathways to detect vulnerabilities, (iii) configuring the symbolic execution process with bounded execution paths, parallel CFG generation, and state management techniques, and (iv) validating identified vulnerabilities to ascertain exploitability;

(e) simultaneously execute multiple pattern matching and analysis processes on outputs from the decompilation, emulation, and symbolic execution processes, comprising:

(i) semantic pattern matching, (ii) functional similarity analysis, (iii) behavioral pattern matching, and (iv) random forest classifier trained on labeled vulnerability datasets for anomaly detection;

(f) integrate, into a unified model, outputs from at least two of: the decompilation process, the emulation process, the symbolic execution process, and the pattern matching and analysis processes;

(g) conduct an examination of the integrated outputs to detect threats;

(h) generate a security report detailing detected issues, severity ratings, and contextual data; and (i) electronically storing the security report locally or displaying the security report on a user interface of the computing device, wherein the security report includes information identifying which combination of the multiple analysis techniques contributed to each detection.

10. The system of claim 9, wherein the memory stores further instructions that, when executed by the processor, cause the system to perform signature-based detection with integrated false positive control by:

(a) incorporating a dedicated domain-specific language (DSL) as an integrating orchestration mechanism within an analytical framework;

(b) implementing a Markov model-based false positive estimation module that predicts false positive probabilities;

(c) implementing an automated calibration process for the Markov model-based false positive estimation module; and (d) enabling streamlined and expedited updates to detection types through the DSL.

11. The system of claim 9, wherein the memory stores further instructions that, when executed by the processor, cause the system to perform disassembly-based detection using a pattern matching system with a Markov model by:

(a) implementing a disassembly pattern matching with an associated pattern language integrated into a rule DSL;

(b) utilizing a Markov model-based statistical analysis module to evaluate assembly patterns during pattern development;

(c) leveraging the disassembly pattern matching in conjunction with the Markov model-based statistical analysis module to detect low-level or obfuscated malware;

(d) facilitating detection of assembly-level component constructs; and (e) optimizing the Markov model-based statistical analysis module through iterative training and adjustment.

12. The system of claim 9, wherein performing the whole-program analysis comprises:

(a) constructing a program dependence graph that combines control and data dependencies across the extracted binary by:

(i) integrating control flow information, (ii) incorporating data dependency information, (iii) synthesizing control and data dependencies into a unified graph, and (iv) applying graph neural networks to analyze the program dependence graph;

(b) applying abstract interpretation techniques with custom abstract domains adapted to common firmware and driver data types.

13. The system of claim 9, wherein performing the decompilation process comprises:

(a) introducing the rule-based decompiler designed to utilize platform-specific rules;

(b) implementing a de-optimizer module within the rule-based decompiler;

(c) providing a compiler that translates platform-specific rules into executable decompilation components;

(d) incorporating a runtime engine that performs analysis;

(e) generating a refined intermediate representation of the extracted binary; and (f) enhancing overall accuracy and efficiency of an analysis process.

14. The system of claim 9, wherein the rule-based decompiler further comprises a reverse engineering system that:

(a) applies convolutional neural networks trained on disassembled firmware datasets for binary classification to identify and reconstruct high-level control structures specific to the infrastructure components; and (b) utilizes a domain-specific language for defining and applying component transformation rules for firmware decompilation.

15. The system of claim 9, wherein the memory stores further instructions that, when executed by the processor, cause the system to implement a retrieval-augmented generation (RAG) system that:

(a) constructs a searchable knowledge base containing component snippets, vulnerability reports, malware signatures, API documentation, and hardware specifications;

(b) generates component embeddings for functions and basic blocks;

(c) performs similarity searches using approximate nearest neighbor algorithms; and (d) augments detection capabilities by dynamically retrieving and incorporating relevant contextual information during analysis.

16. The system of claim 9, wherein the memory stores further instructions that, when executed by the processor, cause the system to implement a multi-agent system with goal coordination that:

(a) deploys specialized artificial intelligence agents that focus on different analysis techniques and share insights through a message-passing coordination framework;

(b) dynamically allocates analytical tasks based on binary characteristics and initial findings;

(c) enables goal-oriented analysis where the specialized artificial intelligence agents define and pursue specific analytical objectives; and (d) integrates with dynamic analysis frameworks to automate debugging tasks.

17. A non-transitory computer-readable storage medium storing instructions that, when executed by a processor, cause the processor to perform a method comprising:

(a) receiving, by a computing device, an infrastructure binary exhibiting predictable execution flows and component reuse patterns associated with infrastructure components;

(b) extracting the infrastructure binary using binary analysis tools to decompose and retrieve individual executable components, thereby producing an extracted binary;

(c) applying multiple analysis techniques to the extracted binary, comprising:

(i) performing a decompilation process on the extracted binary using a rule-based decompiler that:

utilizes interprocedural analysis to trace function calls, variable usage, and pointer references, implements reverse engineering techniques comprising type recovery and discovery using convolutional neural networks trained on disassembled code patterns, constructs control flow graphs (CFGs) through parallel processing mechanisms, and conducts a whole-program analysis to detect cross-function behaviors indicative of threats;

(ii) performing an emulation process on the extracted binary within an emulation environment configured to simulate hardware interfaces;

(d) performing a symbolic execution process on the extracted binary in parallel with the decompilation and emulation processes, comprising:

(i) generating symbolic inputs tailored to infrastructure components, (ii) exploring multiple execution pathways to detect vulnerabilities, (iii) configuring the symbolic execution process with bounded execution paths, parallel CFG generation, and state management techniques, and (iv) validating identified vulnerabilities to ascertain exploitability;

(e) simultaneously executing multiple pattern matching and analysis processes on outputs from the decompilation, emulation, and symbolic execution processes, comprising:

(i) semantic pattern matching, (ii) functional similarity analysis, (iii) behavioral pattern matching, and (iv) random forest classifier trained on labeled vulnerability datasets for anomaly detection;

(f) integrating, into a unified model, outputs from at least two of: the decompilation process, the emulation process, the symbolic execution process, and the pattern matching and analysis processes;

(g) conducting an examination of the integrated outputs to detect threats;

(h) generating a security report detailing detected issues, severity ratings, and contextual data; and (i) electronically storing the security report locally or displaying the security report on a user interface of the computing device, wherein the security report includes information identifying which combination of the multiple analysis techniques contributed to each detection.

18. The non-transitory computer-readable storage medium of claim 17, wherein the method further comprises performing signature-based detection with integrated false positive control and disassembly-based detection using pattern matching with a Markov model.

19. The non-transitory computer-readable storage medium of claim 17, wherein the method further comprises performing whole program analysis by constructing a program dependence graph and applying abstract interpretation techniques with custom abstract domains.

20. The non-transitory computer-readable storage medium of claim 17, wherein the method further comprises implementing a retrieval-augmented generation (RAG) system and a multi-agent system with goal coordination.

* * * * *